(12) United States Patent
Mitsuoka et al.

(10) Patent No.: US 7,099,831 B2
(45) Date of Patent: Aug. 29, 2006

(54) ADVERTISING METHOD AND AWARENESS SERVER

(75) Inventors: Madoka Mitsuoka, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 09/771,692

(22) Filed: Jan. 30, 2001

(65) Prior Publication Data

US 2002/0026355 A1 Feb. 28, 2002

(30) Foreign Application Priority Data

Aug. 30, 2000 (JP) ............................. 2000-261632

(51) Int. Cl.
*G06Q 30/00* (2006.01)
(52) U.S. Cl. ........................ 705/14; 709/238
(58) Field of Classification Search ................. 705/14; 713/200; 709/238
See application file for complete search history.

(56) References Cited

U.S. PATENT DOCUMENTS

| | | | | |
|---|---|---|---|---|
| 5,794,210 A * | 8/1998 | Goldhaber et al. | ........... | 705/14 |
| 5,813,007 A * | 9/1998 | Nielsen | ........... | 707/10 |
| 5,892,900 A * | 4/1999 | Ginter et al. | ........... | 713/200 |
| 5,940,078 A * | 8/1999 | Nagarajayya et al. | ........... | 715/859 |
| 6,205,432 B1 * | 3/2001 | Gabbard et al. | ........... | 705/14 |
| 6,208,659 B1 * | 3/2001 | Govindarajan et al. | ........... | 370/410 |
| 6,243,089 B1 * | 6/2001 | Gong | ........... | 715/744 |
| 6,285,985 B1 * | 9/2001 | Horstmann | ........... | 705/14 |
| 6,330,007 B1 * | 12/2001 | Isreal et al. | ........... | 715/762 |
| 6,546,417 B1 * | 4/2003 | Baker | ........... | 709/206 |
| 6,601,038 B1 * | 7/2003 | Kolls | ........... | 705/14 |
| 6,693,236 B1 * | 2/2004 | Gould et al. | ........... | 84/477 R |
| 6,738,809 B1 * | 5/2004 | Brisebois et al. | ........... | 709/224 |
| 6,807,562 B1 * | 10/2004 | Pennock et al. | ........... | 709/204 |
| 2002/0026355 A1 * | 2/2002 | Mitsoka et al. | ........... | 705/14 |
| 2002/0184089 A1 * | 12/2002 | Tsou et al. | ........... | 705/14 |

FOREIGN PATENT DOCUMENTS

| | | |
|---|---|---|
| JP | 11-506859 | 6/1999 |
| KR | WO 01/63512 A1 * | 8/2001 |
| WO | WP 97/23838 | 7/1997 |

OTHER PUBLICATIONS

IBM Technical Disclosure Bulletin, "New Icons", Oct. 1, 1996, vol. 39, Issue 10, pp. 25-28.*
Kohda, Sugano, Okuyama, IMPP: A New Instant Messaging Standard and Its Impact on Internet Business, 2000, Fujitsu Sci. Tech. Journal, 36, 2, pp. 147-153.*

* cited by examiner

*Primary Examiner*—Eric W. Stamber
*Assistant Examiner*—John Van Bramer
(74) *Attorney, Agent, or Firm*—Staas & Halsey LLP

(57) ABSTRACT

A method executed on a server for distributing user-acceptable and highly effective advertisements and enabling detailed status representation on an awareness system. Advertisement icons such as a company symbol can be subsequently added to alternatives of user statuses and the icons can be set as user statuses. Display of an advertisement icon as status of an acquaintance in a buddy list allows companies to announce services or items they provide as used by the acquaintance represented by the status. Since advertisement icons are propagated via a reliable network composed of acquaintances in the buddy list, users form a favorable impression of the advertisements and high advertising effectiveness is expected.

3 Claims, 30 Drawing Sheets

| User ID | Display Name | Buddy ID | Status Icon | Message | Owned Icon | E-mail Address | Phone Number |
|---------|--------------|----------|-------------|---------|------------|----------------|--------------|
| 700607 | Mitsuoka | 800718,750501 | 23 | Business Trip to Tokyo Today | 1-64,81,90 | mitsu@nifty.com | 09004741679 |
| ... | ... | ... | ... | ... | ... | ... | ... |

Fig. 2

| Icon Number | Icon Address | Coupon Address |
|---|---|---|
| 1 | URL1 | URL1-1 |
| 2 | URL2 | URL2-1 |
| 3 | URL3 | URL3-1 |
| ⋮ | ⋮ | ⋮ |

*Fig. 3*

| User ID | Owned Icon | Reference Count | Copy Count | Referrer |
|---|---|---|---|---|
| 700607 | 1 | 2 | 3 | 800718;750501 |
|  | 2 | 2 | 0 | 800718;750501 |
|  | ⋮ | ⋮ | ⋮ |  |
|  | 64 | 2 | 2 | 987654;123456 |
|  | 81 | 2 | 2 | 800718;750501 |
|  | 90 | 3 | 3 | 987954;123456;800718 |
| 700608 | ⋮ | ⋮ | ⋮ | ⋮ |
| ⋮ |  |  |  |  |

*Fig. 4*

| User ID | Status of Membership Fee Payment |
|---------|----------------------------------|
| 700607  | Not Paid                         |
| 700608  | Paid                             |
| ⋮       | ⋮                                |

Fig. 5

| Reference Count | Coupon File Name | Discount Contents |
|---|---|---|
| 0-50 | coupon1.html | 10 Yen Discount |
| 50-100 | coupon2.html | 20 Yen Discount |
| 100- | coupon3.html | 50 Yen Discount |

ADVERTISING METHOD AND AWARENESS SERVER

BACKGROUND OF THE INVENTION

1. Technical Field

The present invention relates to technologies of an advertising method on a network. More specifically, the present invention relates to a distributing method of information based on a system enabling statuses of each user to be referred to via a network.

2. Description of Related Art

In the present invention, an awareness system means a system enabling statuses of each user to be referred to via a network. In this system, users set a list of acquaintances, what is called a buddy list, and obtain statuses of other users registered in the buddy list. The user statuses and the buddy list are managed by the awareness server.

In these years, communication with an awareness system such as ICQ or AOL Instant Messenger has been rapidly diffused on the Internet. When a user sets a user list called a buddy list in such a system, the user is notified of another user's status registered in the buddy list such as "connected," "present," or "busy." The user refers to the notified user status and can select communication means such as instant message or chat according to the other party's status.

Meanwhile, use of cellular phones having a function for connecting to the Internet rapidly expands and wireless Internet access services for PDA are starting. For these mobile terminals, development of applications for an awareness system is also in progress. For mobile terminals, more detailed user statuses such as "aboard a train," "driving a car," and "at table in a restaurant" are more important than a status such as "connected" in considering timing of making a call or promoting communication.

An effective thing for notifying such status information is an image in icon format. Since display area is limited in mobile terminals, icons that can represent condensed information in a small display area are needed. Therefore text sets of many mobile terminals usually include icons representing faces with various expressions, weather, conveyance, place, etc. Mainly young generations frequently use these icons for short messages or e-mail, using mobile terminals.

In an awareness system, status information that users can select and input themselves as well as information such as network connection status that the system can automatically obtain as user status are useful. Above all, when a user uses a mobile terminal on an awareness system that is used under various conditions, status information that the user inputs is a good source of topics.

However, since input of statuses is troublesome for users and there are no direct merits that counteract such troubles, users often neglect to input statuses. Thus it is conceivably necessary to make status inputted through natural activities of users or give users incentive to voluntarily input status.

Further, a large variety of icons representing status information are needed for detailed status notification. However, in an existing conventional awareness system, since icons are limited to the ones that are prepared by the system, representation of status is limited. To richly represent status, a scheme that can dynamically increase kinds of icons according to needs is required.

Meanwhile, of various services provided on the Internet, services provided for free are almost entirely dependent on advertisement, such as a Web banner. Many awareness systems are provided as one of the free services like this. However, since awareness systems provide private communication among users, advertisements irrelevant to users is less effective and may be repulsive to users, such advertisements are all the worse for mobile terminals with limited display area.

Since Web banner advertisements overflow, the trend is that the level of attention paid to the advertisements is decreasing year after year. An advertisement approach in which only advertisements of interest are distributed by e-mail with a consumer's permission, called opt-in mail is also used. However, the process to generate applications for opt-in mall depends on other advertisement means. Above all for individual-oriented media such as mobile terminals, many users express feelings of resistance toward advertisement distribution by e-mail.

Although companies provide advertisements for consumers, consumers usually have a distrust of companies' advertisements. Accordingly, reputation spread by word of mouth is often a more critical factor than advertisements on the occasion of purchasing services or items. On the Internet, evaluation sites of services and items are provided and are popular among consumers. However, such sites are always occupied by some enthusiastic evaluators and general users do not bother to input evaluation. Therefore, it is difficult for users to naturally know evaluation of familiar friends on the above-mentioned evaluation sites.

SUMMARY OF THE INVENTNION

An aim of the present invention is to provide technologies that distribute user-acceptable and highly effective advertisements and enable detailed status representation on an awareness system.

To solve the above-mentioned problems, the present invention provides a system that enables icons such as a company emblem to be subsequently added to an alternative of user status and to be set as a user status. Namely, a first aspect of the present invention provides an advertising method distributing advertisements from an awareness device managing user status to user terminals on a network, including:

A: storing a symbol representing an advertiser as an alternative for status setting of the above-mentioned user;

B: receiving designation of the above-mentioned symbol from a primary user as self status; and C: distributing the above-mentioned symbol to a secondary user referring to status of the above-mentioned primary user.

Characters or drawings representing advertisers such as icons are displayed as user status. Users can naturally accept the advertisements because the advertisements are practically displayed as statuses of their acquaintances. The advertisers can expect effect by word of mouth among users.

Icons used for representing user status are any of the icons stored as alternatives of status setting of each user. Hereinafter such icons are referred to as user-owned icons. Incidentally, correlating users and icon identifiers instead of icon files suffices to store each user's user-owned icon.

Symbols such as icons may be representation of items or services of advertisers as well as representation of advertisers themselves.

A second aspect of the present invention provides an advertising method according to the first aspect, wherein the above-mentioned use request is accepted on a Web Page provided by the above-mentioned advertiser, and the above-mentioned symbol is added to alternatives of status setting of a user that requested use of the above-mentioned symbol on the above-mentioned Web Page.

For example, an "icon set" button is provided for a Web Page of an advertiser and an address of an awareness device and an icon file name of the advertiser are embedded in the button. When a user clicks the button, a user terminal accesses the awareness device and passes the icon file name. The awareness device adds the passed icon file name to owned icons of the requesting user.

By enabling icons that are expressive means of user status to be added by user request, more detailed status can be expressed. Increase of icon users enables advertising effectiveness to be enhanced more.

A third aspect of the present invention provides an advertising method according to the first aspect, which further includes the following steps:

accepting use request of the symbol from the above-mentioned secondary user that received the above-mentioned symbol as a status of the above-mentioned primary user; and adding the above-mentioned symbol to an alternative for status setting of the above-mentioned secondary user.

For example, an awareness device sets an icon designation button and an icon copy request button in a screen displaying user status. When the awareness device receives icon designation and its copy request from a user terminal, the awareness device adds the icon to owned icons of the requesting user. It enables icons representing user status to be increased according to user's needs and more detailed user status to be expressed. Increase of icon users enables advertising effectiveness to be enhanced.

A fourth aspect of the present invention provides an advertising method according to the first aspect of the present invention, which further comprises the following steps:

accepting use request of the symbol from the above-mentioned secondary user that received the above-mentioned symbol as a status of the above-mentioned primary user and adding the above-mentioned symbol to an alternative for status setting of the above-mentioned secondary user; and requesting the above-mentioned secondary user or advertiser to pay charge of the above-mentioned symbol.

In this method, charge of symbols is collected from users or advertisement rate is collected from advertisers. This is because if a user sets a company symbol of an advertiser as self status, there is a benefit to the advertiser that advertisements of the company are distributed at the user's cost. In this way, providers of an awareness device can obtain charge of symbols.

A fifth aspect of the present invention provides an advertising method according to the first aspect, wherein a symbol representing the above-mentioned advertiser and privileges provided by the above-mentioned advertiser are stored.

This methods further comprises a step of;

when the designation of the above-mentioned symbol by the above-mentioned primary user is accepted as a self status, the above-mentioned primary user is notified of privileges provided by an advertiser that is represented by the designated symbol.

When a user sets an icon as a self status, privileges such as present of discount and points and prize for the discount and points are provided. Privileges of icon setting is expected to be incentive for status setting. Particularly, they are conceivably effective when a user must manually input his self status.

A sixth aspect of the present invention provides an advertising method according to the first aspect. This method further comprises steps of:

privileges are provided for a user on the above-mentioned advertiser's Web Page and designation of the above-mentioned symbol as a user's status is accepted;

the above-mentioned awareness device is notified that the above-mentioned symbol is set as a user status from the above-mentioned user terminal or the above-mentioned advertiser; and the above-mentioned symbol is set by the above-mentioned awareness device as the above-mentioned user status.

For example, an advertiser displays an "icon set" button with privileges on a Web Page. A user comes to an outlet and shows a clerk the Web Page where privileges are displayed. At this moment, the user pushes the "icon set" button to set his self status. User status may be automatically set by notifying an awareness device of it from an HTTP server of the advertiser which provided coupons.

A seventh aspect of the present invention provides an advertising method according to the first aspect. This method further comprises steps of:

symbols of the above-mentioned advertiser and reference count of the above-mentioned symbols during predetermined period are stored; and the above-mentioned advertiser is charged according to the reference count during the predetermined period.

A provider of an awareness system increments reference count of a relevant icon every time the awareness system distributes icons to users and calculates charge amount of the advertiser according to the reference count for a month, for example.

An eighth aspect of the present invention provides an advertising method according to the first aspect. This method further comprises a step of:

incentive is provided for the above-mentioned primary user according to secondary user's reference count of symbol set as primary user's status or count of the above-mentioned symbol being added to alternatives of status setting by the secondary user.

Coupons from advertisers are provided for users according to reference count or copy count of an icon set as a self status.

A ninth aspect of the present invention provides an advertising method according to the first aspect. This method further comprises steps of:

purchase information representing a user purchased items or services of an advertiser when he purchases them at an outlet is sent to a terminal of the above-mentioned outlet;

predetermined process based on the above-mentioned purchase information is performed at the above-mentioned outlet and then the above-mentioned awareness device is notified of a symbol of the above-mentioned advertiser and the above-mentioned user from the above-mentioned user terminal or the above-mentioned outlet terminal; and the awareness device that received the above-mentioned notification sets a symbol representing a notified advertiser as a notified user's status.

The above-mentioned outlet includes substantial outlets and virtual outlets such as an online shopping site. Purchase information is, for example, account settlement information including card number, card type, and card expiration date or points given to customers according to purchase history of the customers. For substantial outlets, non-contact IC card and IC card reader are provided and purchase information is inputted in the outlet terminal. Purchase information may be wirelessly sent and received. Furthermore, outlet terminals may read points from cards recording user's purchase history. In this case, user terminals are unnecessary.

Any icon-identifiable information instead of icon file itself can be icons stored in outlet terminals. By sending an icon and a user to the awareness device from a user terminal or an outlet terminal, user status can be automatically set through account settlement process or point addition process.

A tenth aspect of the present invention provides an advertising method according to the first aspect. This method further comprises steps of:

operable or outputtable contents on the above-mentioned user terminal and a symbol representing the above-mentioned contents are stored in any of the terminals on the above-mentioned network;

the above-mentioned awareness system is notified of the above-mentioned symbol representing the above-mentioned contents and the above-mentioned user from the above-mentioned terminal on the network if the above-mentioned user selected any of the above-mentioned contents; and the above-mentioned awareness device that received the notification sets the symbol representing the contents as a status of the above-mentioned user.

Herein contents are various applications operable on user terminals, voice files, image files, text files, etc. For example, when a user selected a mahjongg game played on a network, an icon representing a mahjongg game is set as a user status. When a user selected music or movie, a title of the music or movie is set as a user status. An icon representing that music is listened to or movie is seen may be set as a user status.

An eleventh aspect of the present invention provides an advertising method according to the first aspect. This method further comprises a step of:

by storing a symbol of an advertiser in a device installed in an outlet of the advertiser and wirelessly sending the above-mentioned symbol to a user terminal, the symbol of the advertiser is set as a user status when the user comes to the outlet.

User terminals detects wireless signal inside an outlet and sets a symbol as a self status. The user is unnecessary to manually input self status and detailed status setting can be enabled with user burden reduced.

A twelfth aspect of the present invention provides a computer-readable recording medium recording a program of an advertising method distributing advertisements to user terminals on a network, being used by an awareness device managing user status. The above-mentioned program executes steps of:

A: storing a symbol representing an advertiser as an alternative for status setting of the above-mentioned user;

B: accepting designation of the above-mentioned symbol from a primary user as a self status; and C: distributing the above-mentioned symbol to a secondary user referring to status of the above-mentioned primary user.

A thirteenth aspect of the present invention provides an awareness server managing user status, comprising storing means, accepting means, and distributing means. Storing means stores a symbol representing an advertiser as an alternative for status setting of the above-mentioned user. Accepting means accepts designation of the above-mentioned symbol from a primary user as a self status. Distributing means distributes the above-mentioned symbol to a secondary user referring to status of the above-mentioned primary user.

The fourteenth aspect of the present invention provides a user status setting method on an awareness system according to the first aspect of the present invention, accepting a symbol including advertisement information from an advertiser as a symbol representing user status, presenting the above-mentioned symbol as one of the alternatives of user status setting, and enabling the above-mentioned symbol including advertisement information to be set as user status by the selection of the above-mentioned user. More specifically, the fourteenth aspect of the present invention provides a user status setting method comprising the following steps:

A: previously accepting a symbol including advertisement information from an advertiser as information for status setting of a user;

B: selectablly presenting a symbol including advertisement information provided by the above-mentioned advertiser as information on user status and setting a symbol including advertisement information selected by a user as a user status; and C: presenting a symbol including advertisement information as user status information when status reference request of the relevant user is accepted.

A fifteenth aspect of the present invention provides a word-of-mouth advertising method using awareness services accepting and storing information on user status via a network, accepting request of a user and sending information on other users via a network, and enabling required user status to be referred to. This method comprises steps of:

a symbol including advertisement information is previously accepted as information for user status setting from an advertiser;

the above-mentioned stored symbol is selected and set as information of user status by direction or act of the user; and the above-mentioned symbol including the above-mentioned advertisement information is presented to the primary user requesting reference as status information set for the secondary user when reference request of secondary user's status of the primary user is accepted.

A sixteenth aspect of the present invention provides a word-of-mouth advertising method using awareness services accepting and storing information on user status via a network, accepting request of a user and sending information on other users via a network, and enabling required user status to be referred to. This method comprises steps of:

a symbol including advertisement information is previously accepted and stored as an alternative of user status setting from an advertiser;

the above-mentioned symbol including advertisement information provided by the advertiser is selected and set as information on status of the above-mentioned primary user by direction or act of the primary user;

when reference request of the above-mentioned primary user is accepted from the secondary user, a symbol including advertisement information is presented as status information set for the above-mentioned primary user; and the above-mentioned secondary user sets the presented symbol including advertisement information as a self status.

Since use of the present invention enables various advertisements to be distributed by word-of-mouth effect, advertisements are acceptable to users and higher advertising effectiveness can be expected. Since symbols representing user statuses are dynamically added, more detailed status expression is enabled.

BRIEF DESCRIPTION OF THE DRAWINGS

FIG. 2 is a conceptual explanatory diagram of user DB;

FIG. 3 is a conceptual explanatory diagram of icon DB;

FIG. 4 is a conceptual explanatory diagram of reference count DB;

FIG. 5 is a conceptual explanatory diagram of member DB;

FIG. 6 is a conceptual explanatory diagram of coupon DB;

Example of status setting screen

Example of status icon selection screen

Example of status setting notification screen

Figure 15:
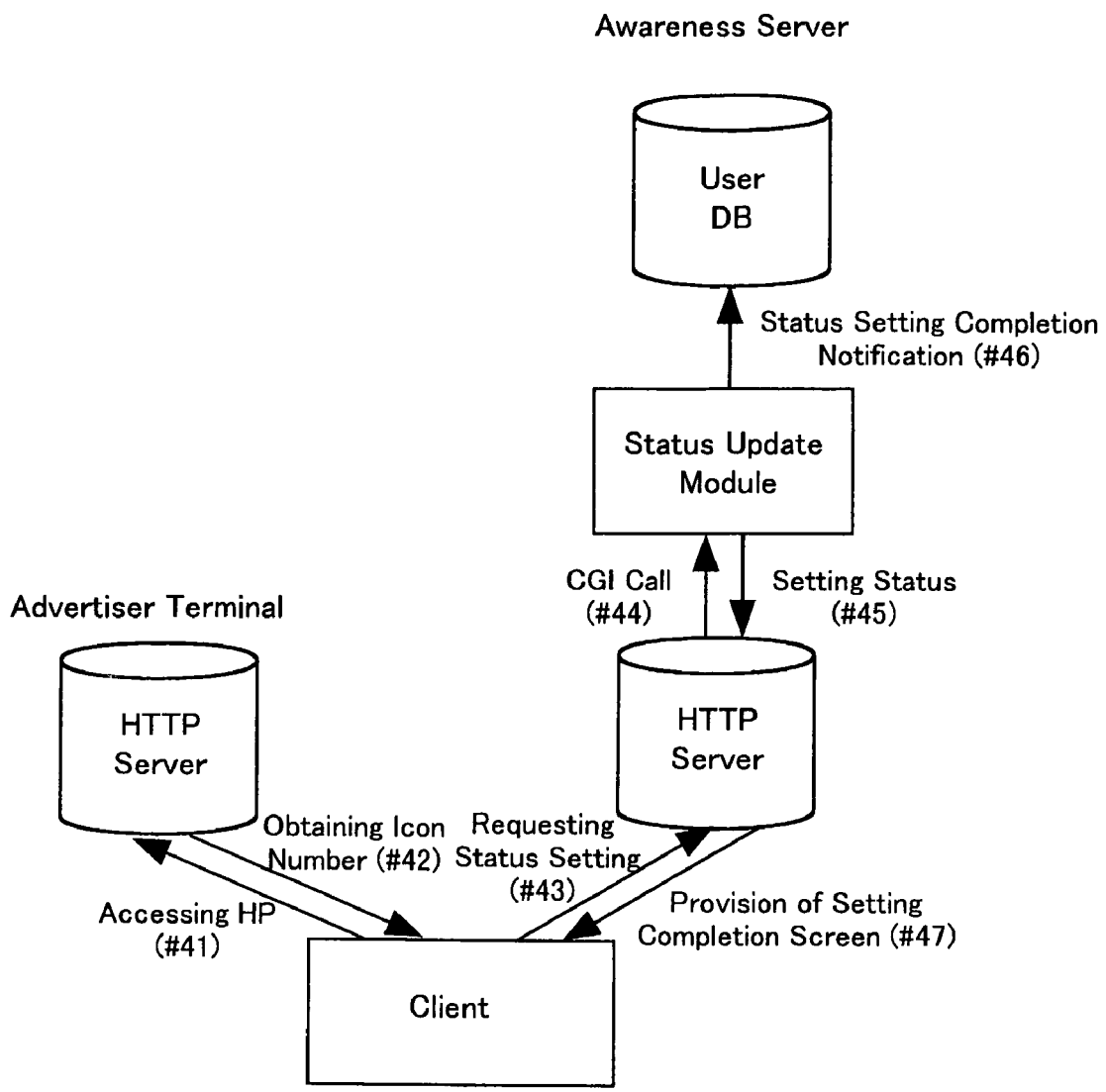
Figures 16A, 16B:
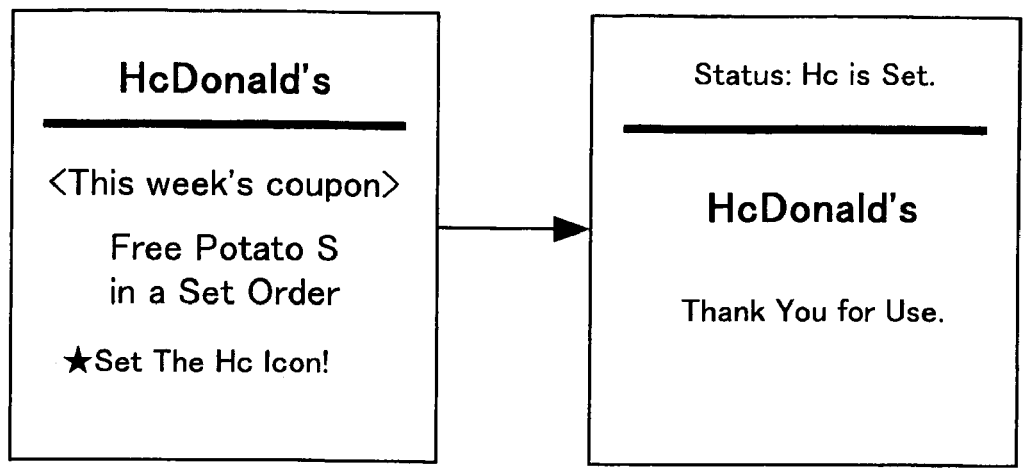
Figure 17:
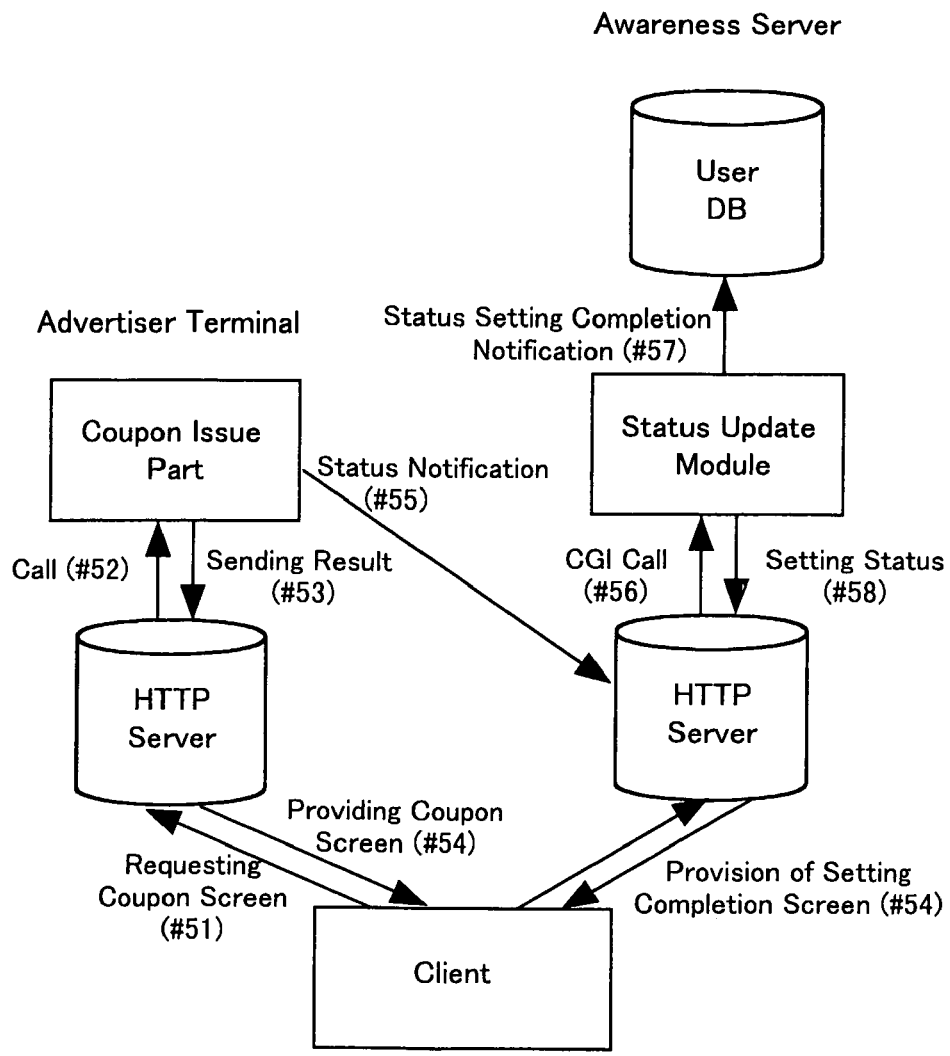
Figure 18A:
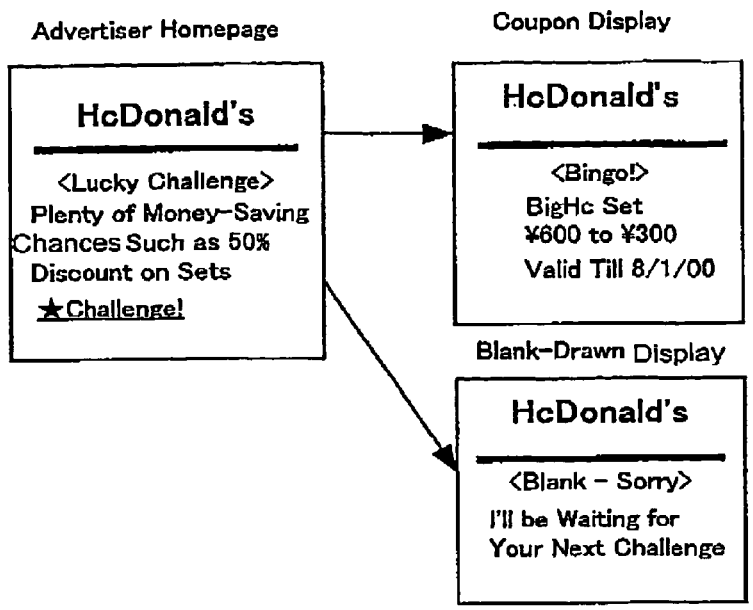
Figure 18B:
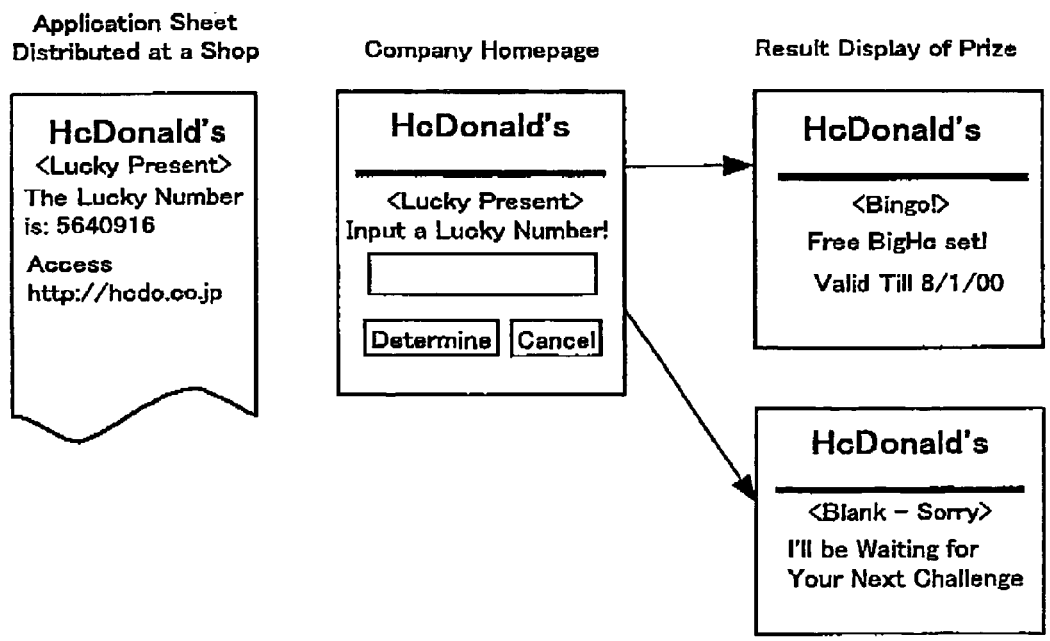
Figure 19:
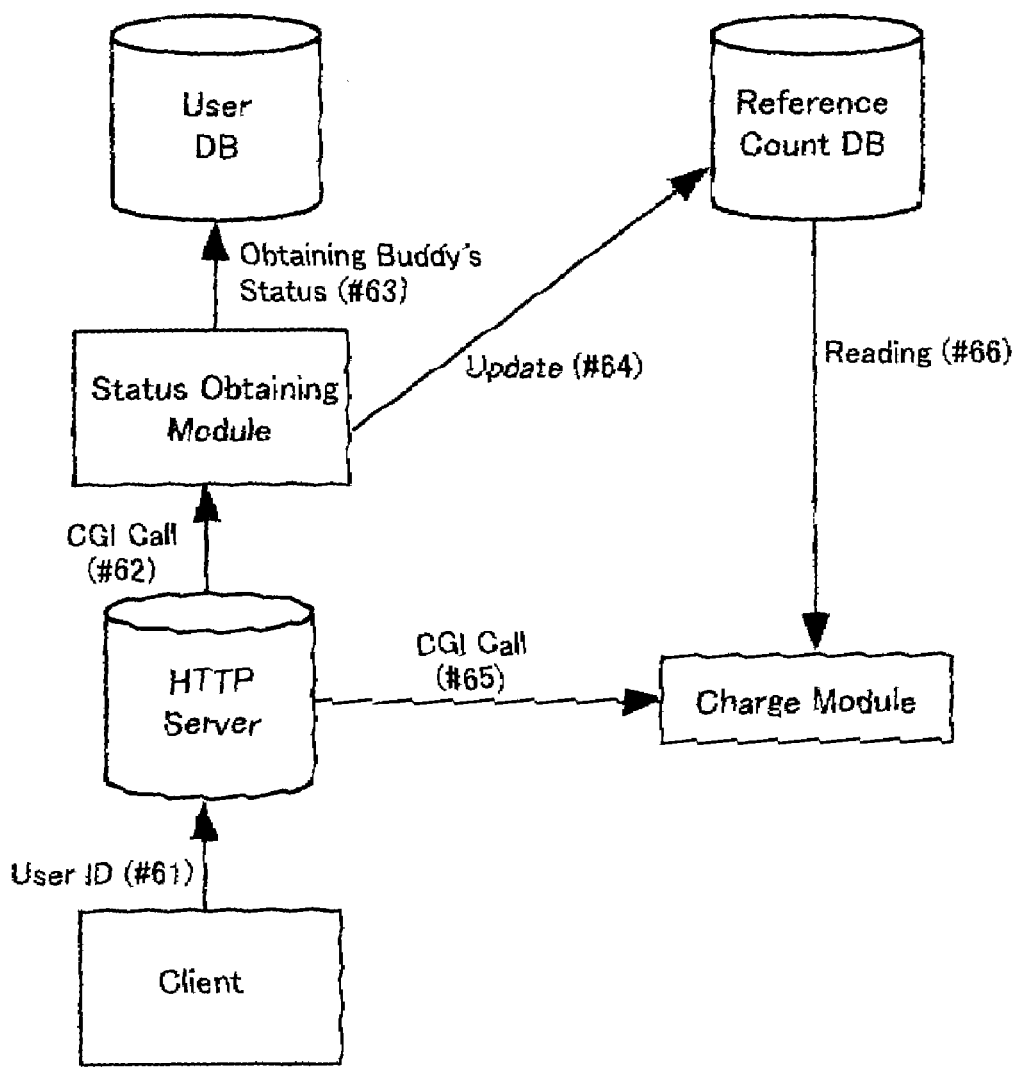
Figure 20:
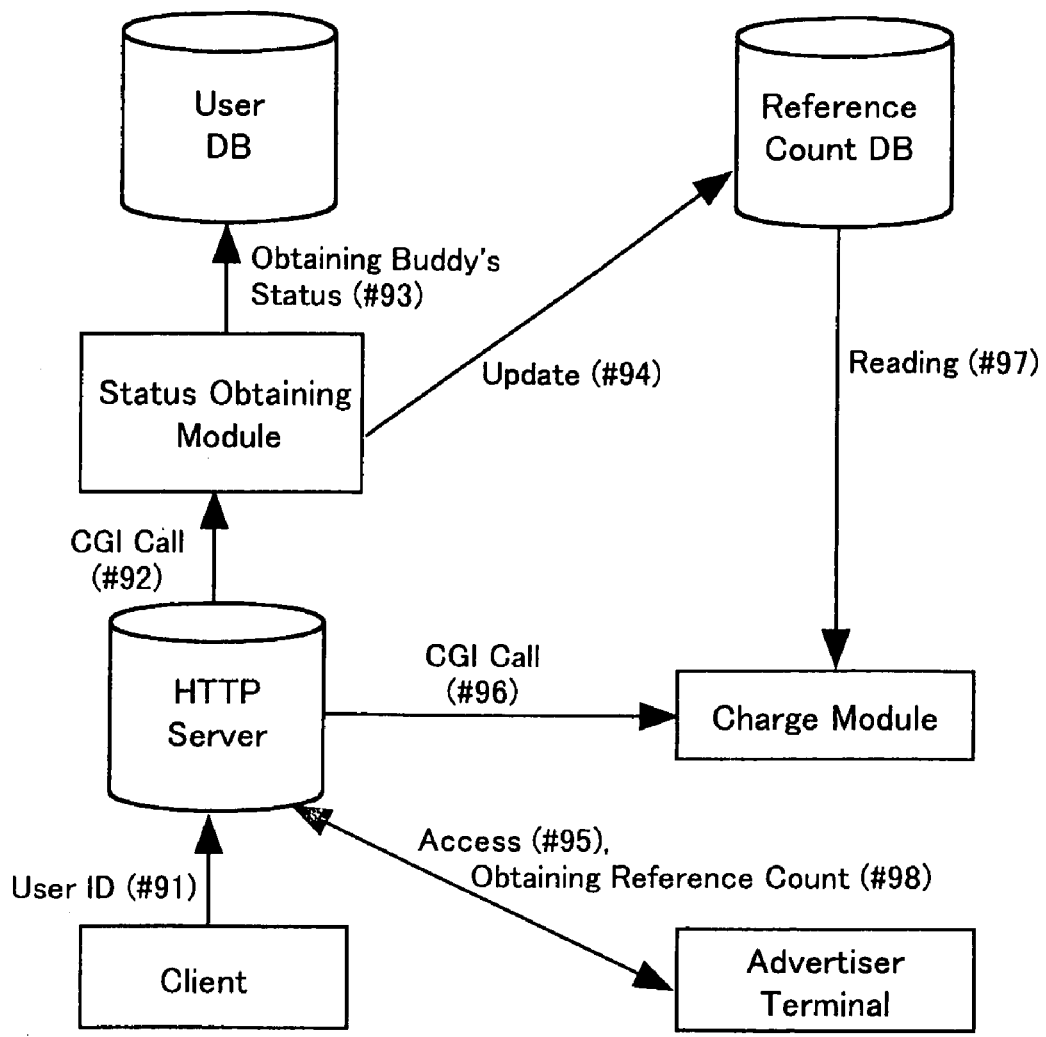
Figure 21:
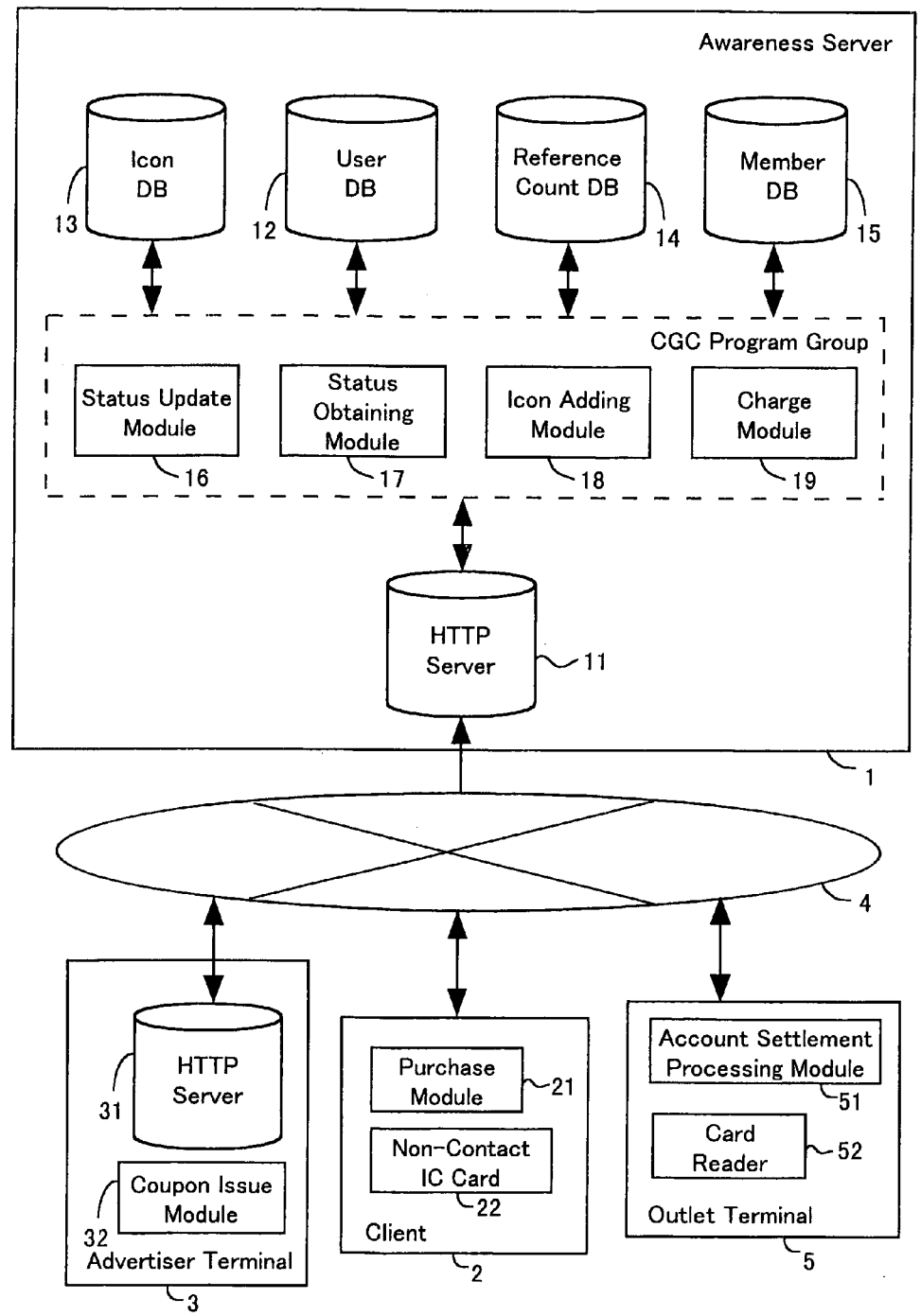
Figure 22:
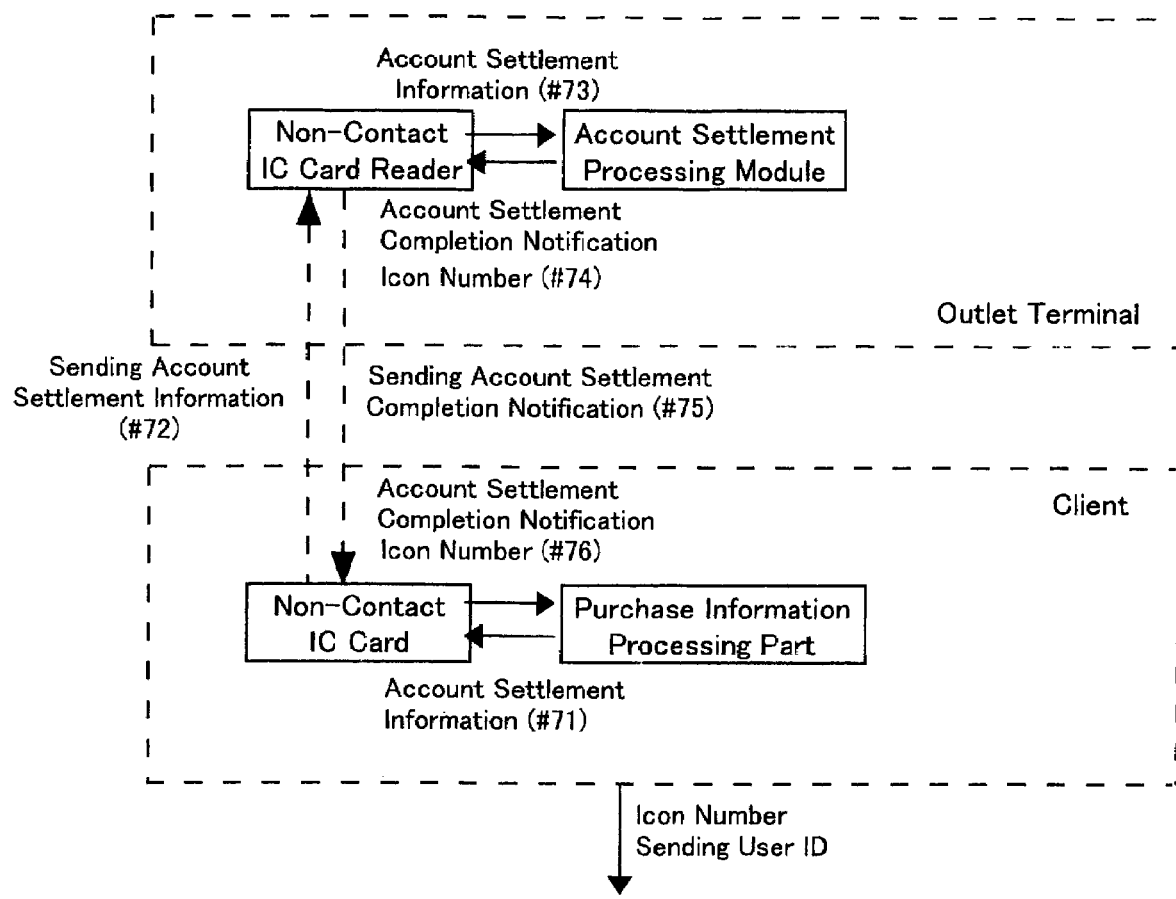
Figure 23:
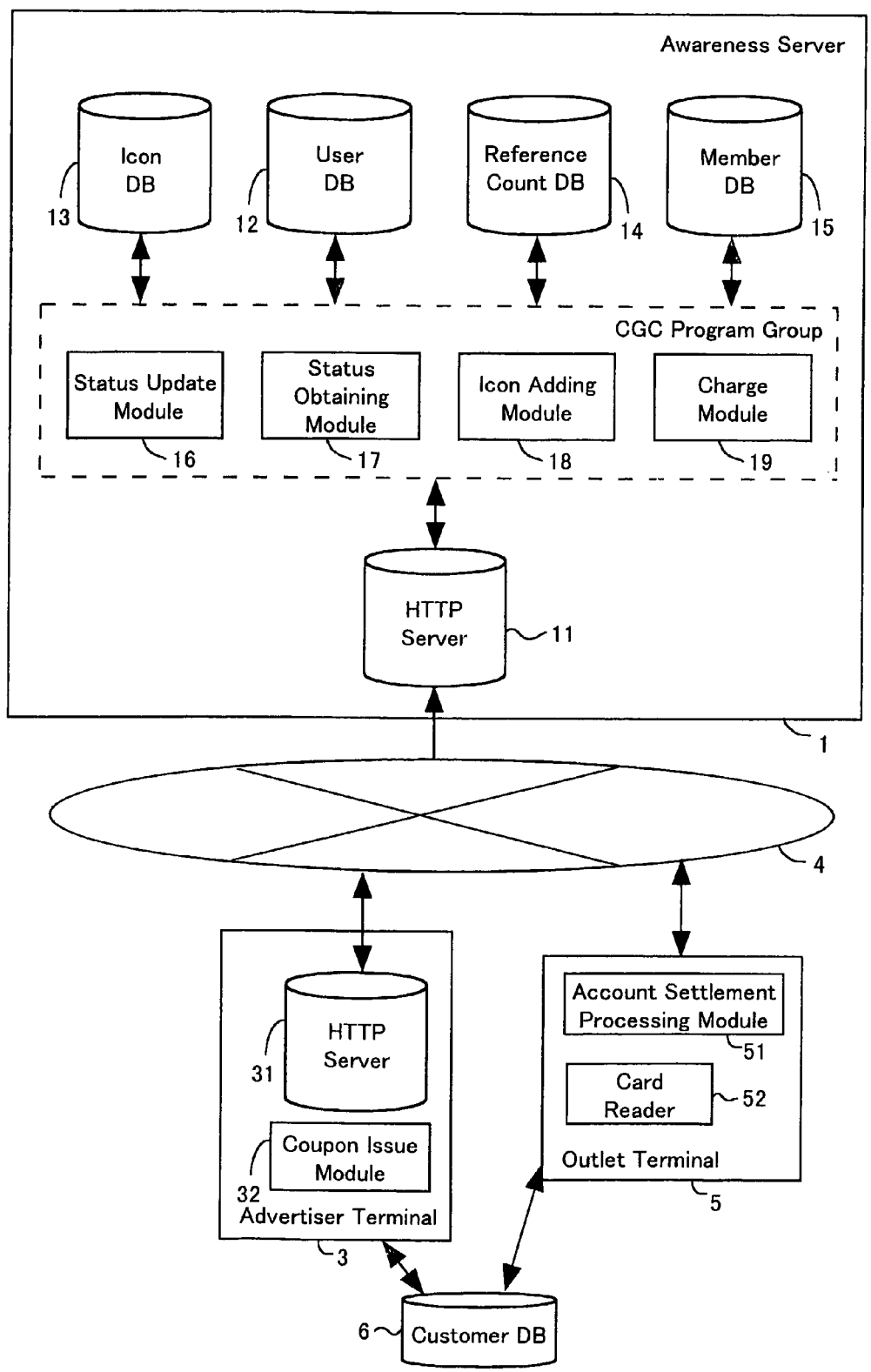
Figure 24:
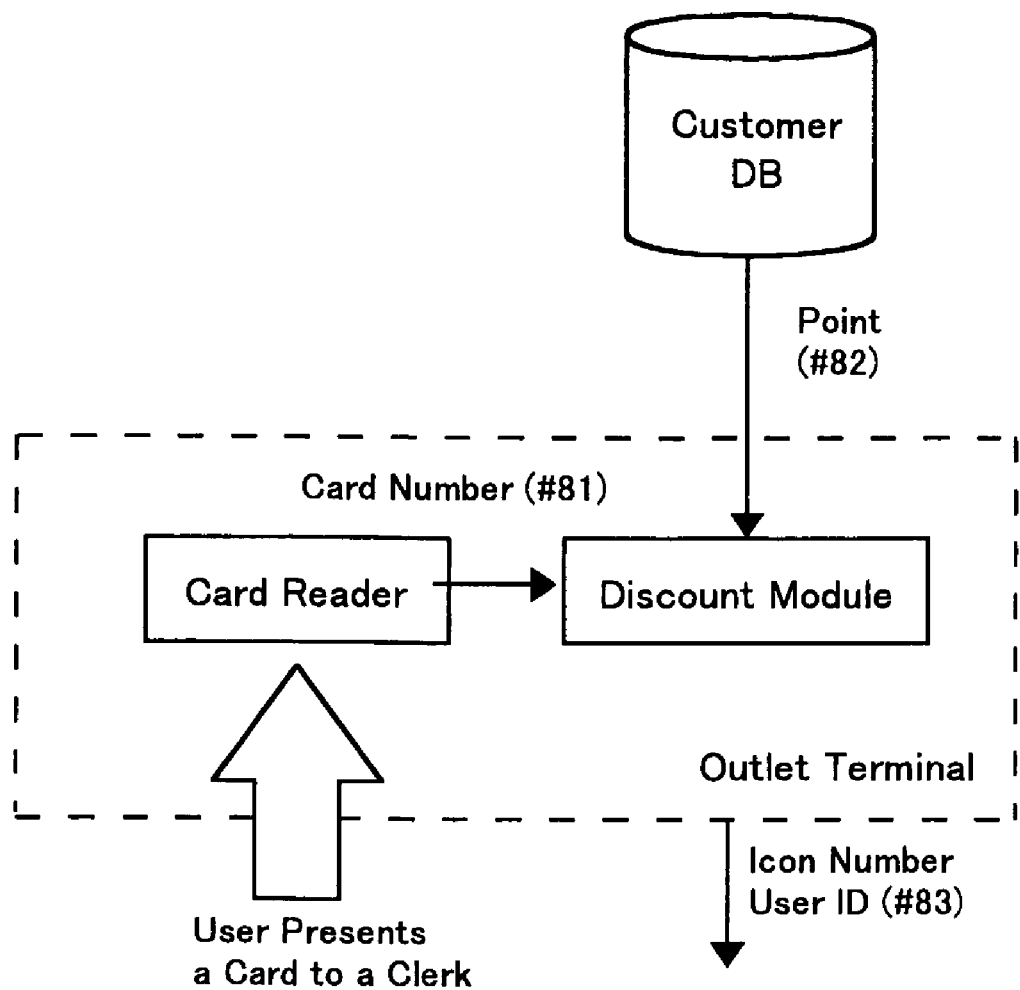
Figure 25:
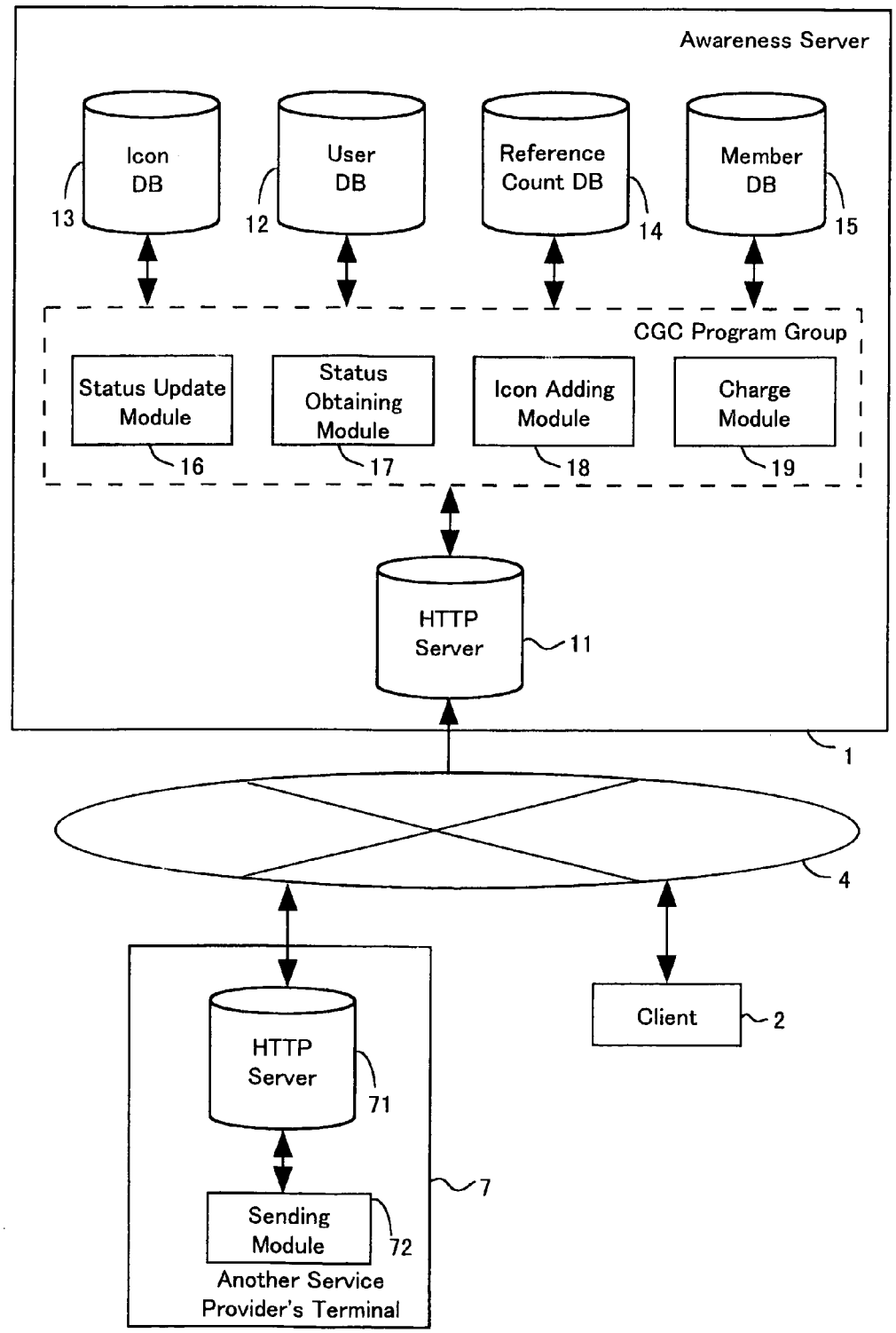
Figure 27:
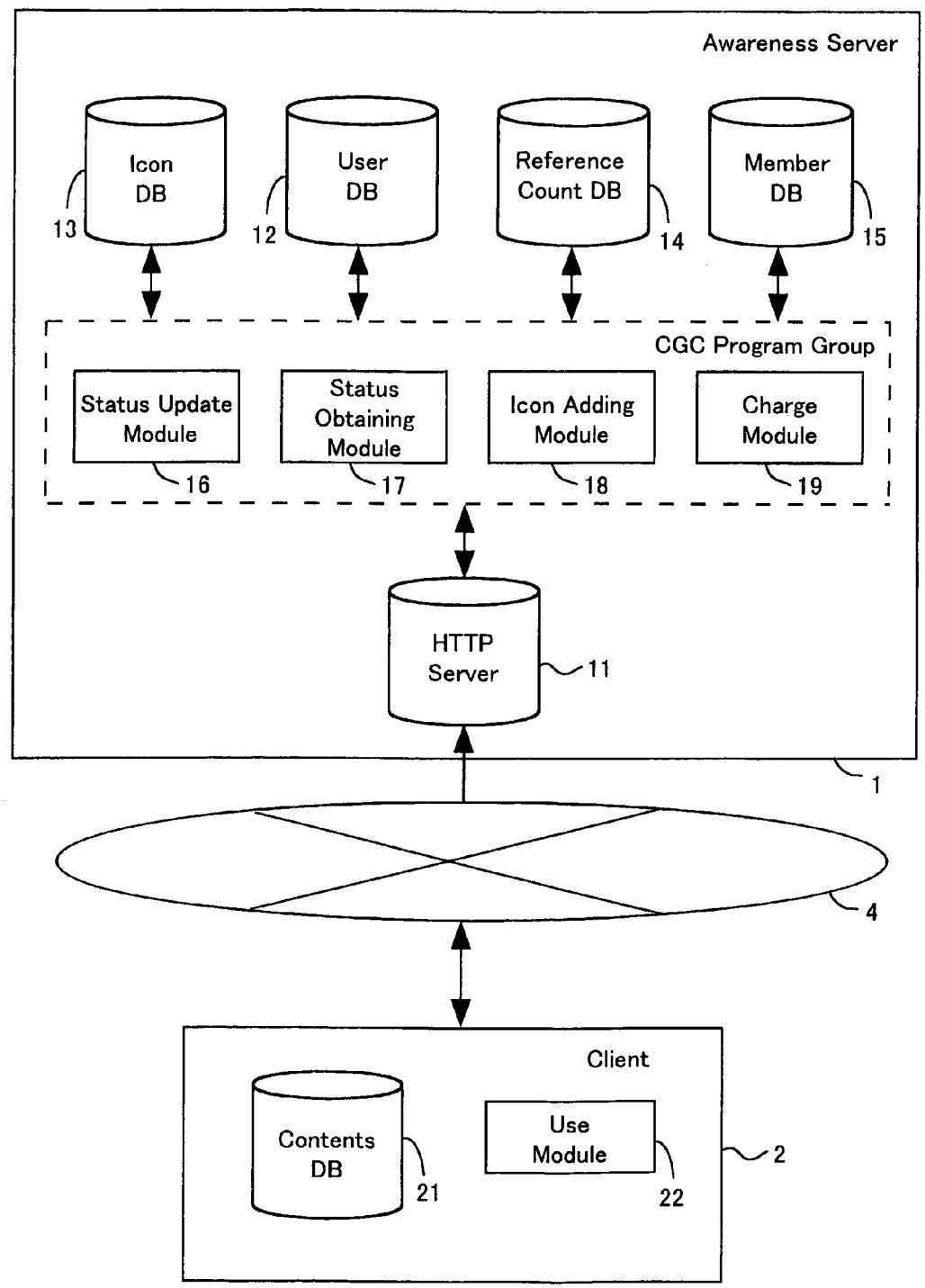
Figure 29:
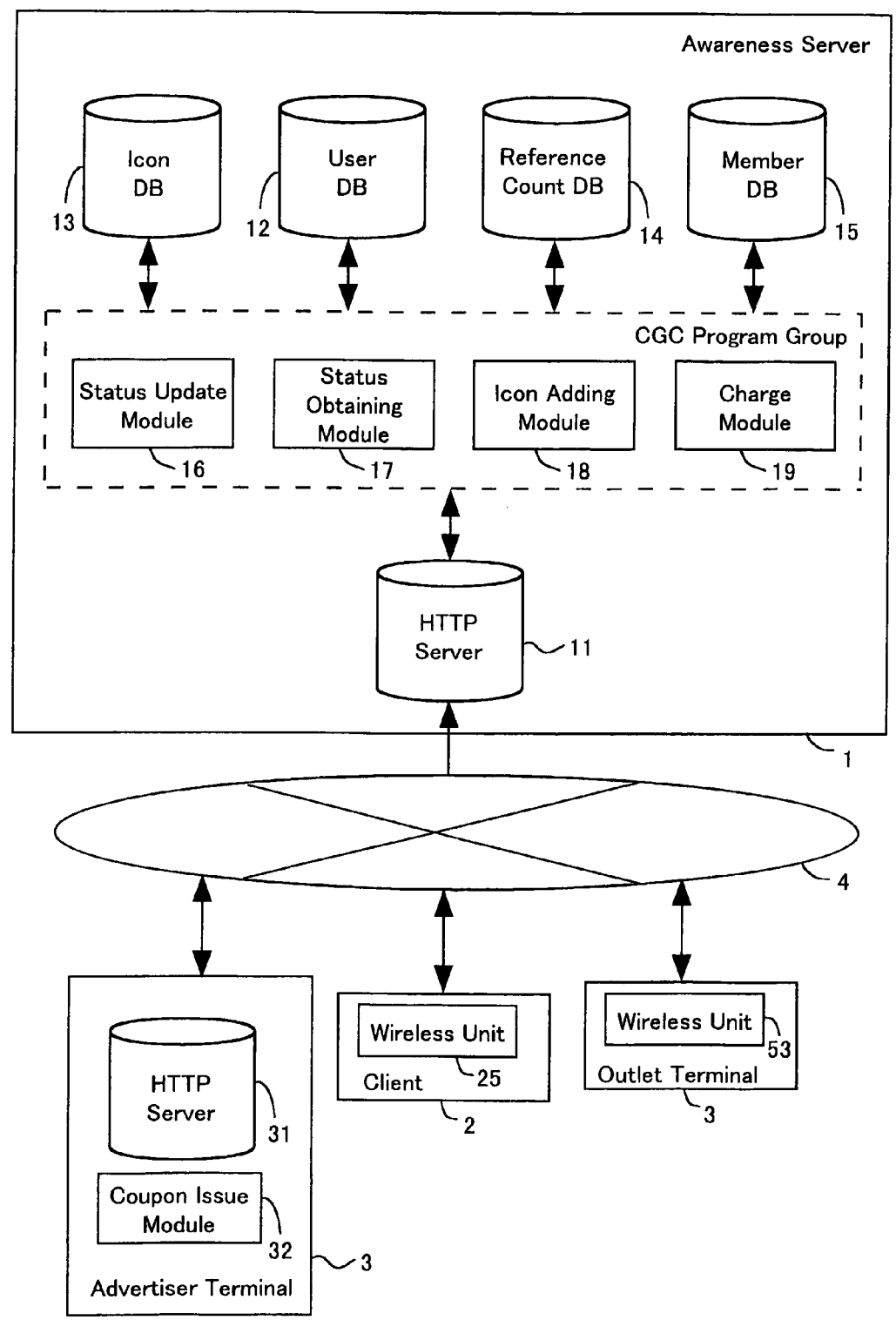
Figure 30:
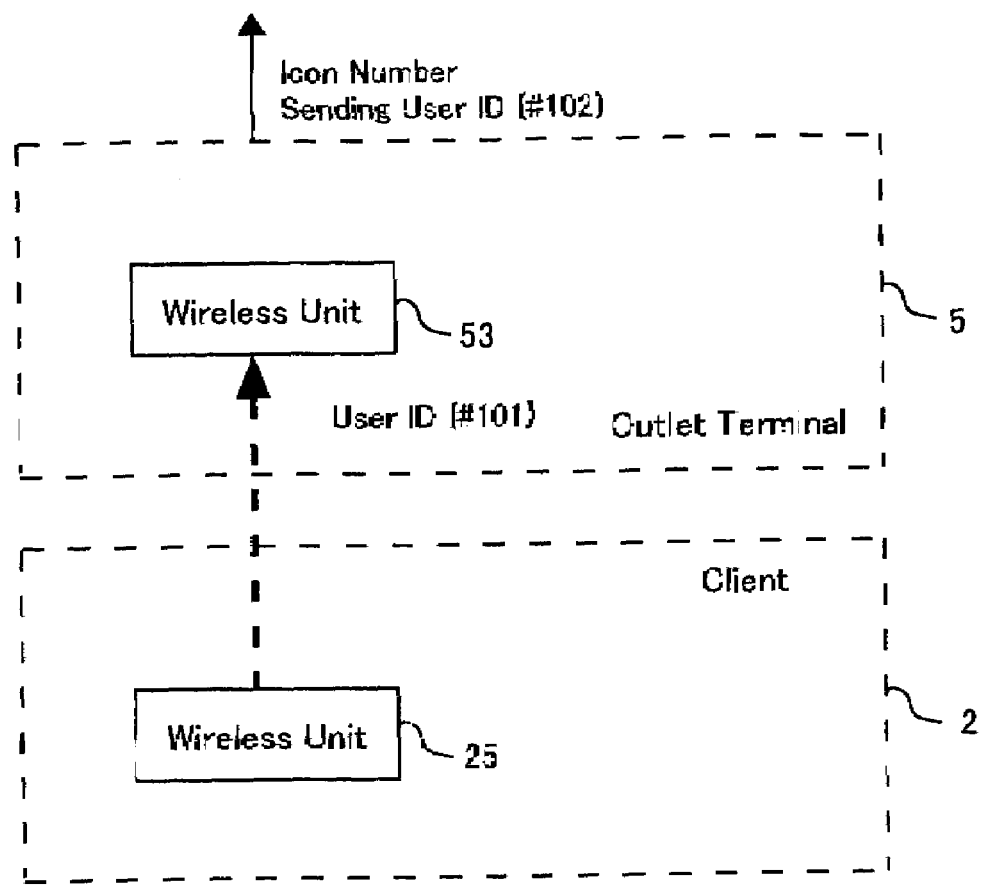
Figure 31:
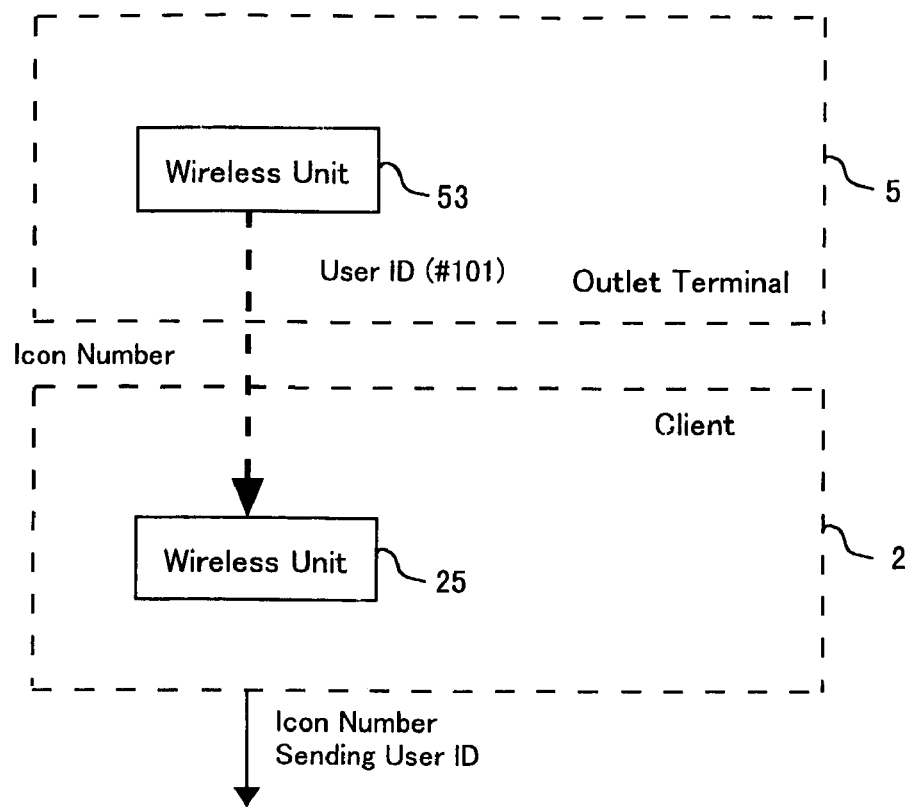

FIG. 15 is an explanatory diagram showing flow of coupon provision and icon setting process (4-1);

FIG. 16A is an example of a screen providing coupons and an icon set button;

FIG. 16B is an example of status setting notification screen;

FIG. 17 is an explanatory diagram showing flow of coupon provision and icon setting process;

FIG. 18A is a screen example of a result of coupon application;

FIG. 18B is a screen example of a result of prize application;

FIG. 19 is an explanatory diagram of charging process based on icon reference count;

FIG. 20 is an explanatory diagram showing flow of incentive process according to icon reference count;

FIG. 21 is a configuration diagram of an awareness system according to a second embodiment of the present invention;

FIG. 22 is an explanatory diagram showing flow of icon setting process performed at purchase;

FIG. 23 is a configuration diagram of an awareness system according to a third embodiment of the present invention;

FIG. 24 is an explanatory diagram showing flow of icon setting process while a card is used;

FIG. 25 is a configuration diagram of an awareness system according to a forth embodiment of the present invention;

FIG. 26A is an example of network service election screen;

FIG. 26B is an example of a status setting notification screen;

FIG. 27 is a configuration diagram of an awareness system according to a fifth embodiment of the present invention;

FIG. 28A is an example of contents selection screen;

FIG. 28B is an example of status display;

FIG. 29 is a configuration diagram of an awareness system according to a sixth embodiment of the present invention;

FIG. 30 is an explanatory diagram showing flow of process setting user status at user's coming to an outlet (set on outlet terminal); and FIG. 31 is an explanatory diagram showing flow of process setting user status at user's coming to an outlet (set on client).

DETAILED DESCRIPTION OF THE PREFERRED EMBODIMENTS

Overview of the Invention

The present invention provides a system that enables advertisement icons such as company symbols to be subsequently added to alternatives of user status (hereinafter referred to as owned icon) and advertisement icons to be set as user status. Display of an advertisement icon as status of an acquaintance in a buddy list notifies a user that the acquaintance makes use of services or items provided by the company. Since advertisement icons are diffused via a reliable network composed of acquaintances in the buddy list, users have a good impression on the advertisements and high advertising effectiveness is expected.

Furthermore, users can copy icons that the users do not own from status icon display of other users in a buddy list and add them to owned icons. In this way, reputation by word of mouth is diffused and advertisements are extensively distributed at the cost of users instead of companies. By enabling owned icons to be added, expressive power of users is enhanced and the awareness system becomes more attractive.

In this system, status input can be automatically performed by seizing the timing of utilization of a coupon or account settlement when a user uses a company. In this way, status setting frequency is dramatically increased.

A provider of an awareness system can expect increase of users because services themselves are more attractive for users, and gain advertisement rates from advertisers according to distribution number, etc.

First Embodiment

[A] Configuration

Figure 1:
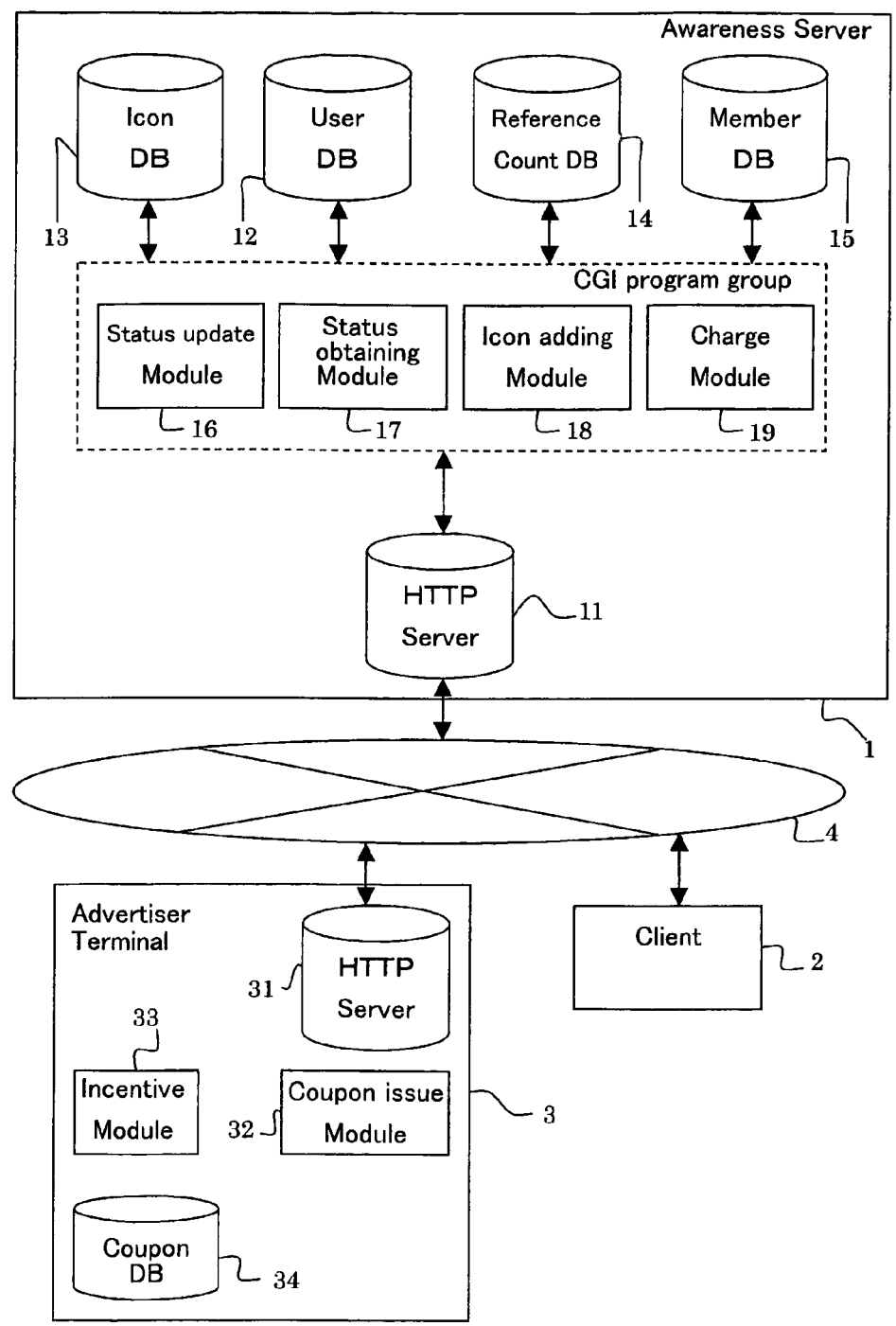
FIG. 1 is a configuration diagram according to a first embodiment of the present invention.

FIG. 1 is a configuration diagram of an awareness system according to the first embodiment of the present invention. This awareness system is configured by connecting awareness server 1 to client 2 and advertiser terminal 3 via network 4.

(1) Awareness Server

The awareness server 1 has HTTP server 11, user DB 12, icon DB 13, reference count DB 14, member DB 15 and predetermined CGI program group. The HTTP server 11 functions as an interface for sending and receiving data with the client 2 and the advertiser terminal 3.

The user DB 12 stores information shown in FIG. 2. In this example, the user DB 12 stores "user ID," "display name" representing user, "buddy ID," "status icon" representing user status, "message" set by a user, "owned icon" of a user, "e-mail address," and "phone number" for each user.

Herein "user ID" is an identification information for identifying users in the awareness system. Each user is previously registered in the awareness system. "Buddy ID" stores user IDs of other users registered in a buddy list by a user i.e. buddies. "Status icon" stores identification information of advertisement icons representing current user status. In this embodiment, icon numbers are assigned to each advertisement icon and used as identification information. "Message" stores text message from the user to a buddy. "Owned icon" stores icon numbers of advertisement icons that can be set by the user as a self status.

As show in FIG. 3, the icon DB 13 stores "icon number" for identifying advertisement icons, "icon address," and "coupon address" if coupon is set. "Icon address" is a pointer of an icon file and icon files instead of addresses may be stored. The coupons may be stored as in the case with icon files. Each icon is previously created by an advertiser and is registered in the icon DB 13.

The reference count DB 14 stores information shown in FIG. 4. In this example, the reference count DB 14 stores "user ID", "owned icon" of users, "reference count" that represents reference count of an advertisement icon, "copy count" that represents copy count of the advertisement icon, and user ID of "referrer" that referred to the advertisement icon. If an advertiser is charged according to reference count, the DB may store only each advertisement icon and its reference count.

As shown in FIG. 5, the member DB 15 stores "user ID" and "membership due payment progress" of the user. This DB stores users permitted to be members using advertisement icons registered in the icon DB 13.

The following explains CGI program group retained by the awareness server 1 by referring to FIG. 1 again. The program group has status update module 16, status obtaining module 17, icon adding module 18, and charge module 19.

The status update module 16 receives setting such as new user status and messages and stores it in the user DB 12. Advertisement icons may be set as user status. The status obtaining module 17 receives request of the client 2, obtains status of a user registered in the user DB 12 as a buddy, and sends it to the requester client 2. An advertisement icon may be set as user status obtained from the user DB 12.

The icon adding module 18 adds a new icon to user-owned icons according to the request of the client 2. The charge module 19 calculates charge on a user or advertiser according to the member DB 15 and the reference count DB 16. The detailed description concerning processing performed by the modules is given later.

(2) Client

Specifically, the client 2 is a computer used by a user such as a mobile terminal or personal computer. An application for the client 2 for configuring an awareness system operates in the client 2 (not shown in the figure). With this application, the client 2 obtains status of a buddy from the awareness server 1 or sends user status to the awareness server 1.

An Web browser for accessing homepages of advertisers is preferably installed in the client 2.

(3) Advertiser Terminal

For this system, HTTP server 31, coupon issue module 32 that is a CGI program, incentive module 33, and coupon DB 34 are installed in the advertiser terminal 3. The HTTP server 31 functions as an interface for communicating the awareness server 1 and the client 2. The coupon issue module 31 issues coupons at predetermined probability to the client 2 who accessed and notifies it of the result. The incentive module 33 provides incentives such as discount service or a coupon ticket for users that extensively informed many users of advertisement icons.

FIG. 6 is a conceptual explanatory diagram of a coupon table stored in the coupon DB 34. The coupon DB stores coupon files prepared by advertisers as well as a coupon table shown in the figure. In the coupon files, discount contents are described. In the coupon table, coupon file names and discount contents provided for users according to icon reference count of advertisers are stored. Incidentally, the coupon DB can be made to store incentive based on copy counts of advertisement icons.

Process Flow

Processing performed by the awareness server 1 according to the first embodiment of the present invention is roughly divided into the following six processes:

(1) advertisement icon obtaining process;

(2) advertisement icon copy process;

(3) coupon providing process in the case that an advertisement icon is set as a user status;

(4) advertisement icon setting process by use of coupon;

(5) charge process based on icon reference count; and (6) incentive process based on icon reference count.

The following specifically describes the above-mentioned six processes. For simplification, an advertiser is taken for "HcDonald's" and his icon is taken for "Hc" in the following description. "HcDonald's" provides various privileges for users on his Web Page.

(1) Flow of Icon Obtaining Process

Figure 7:
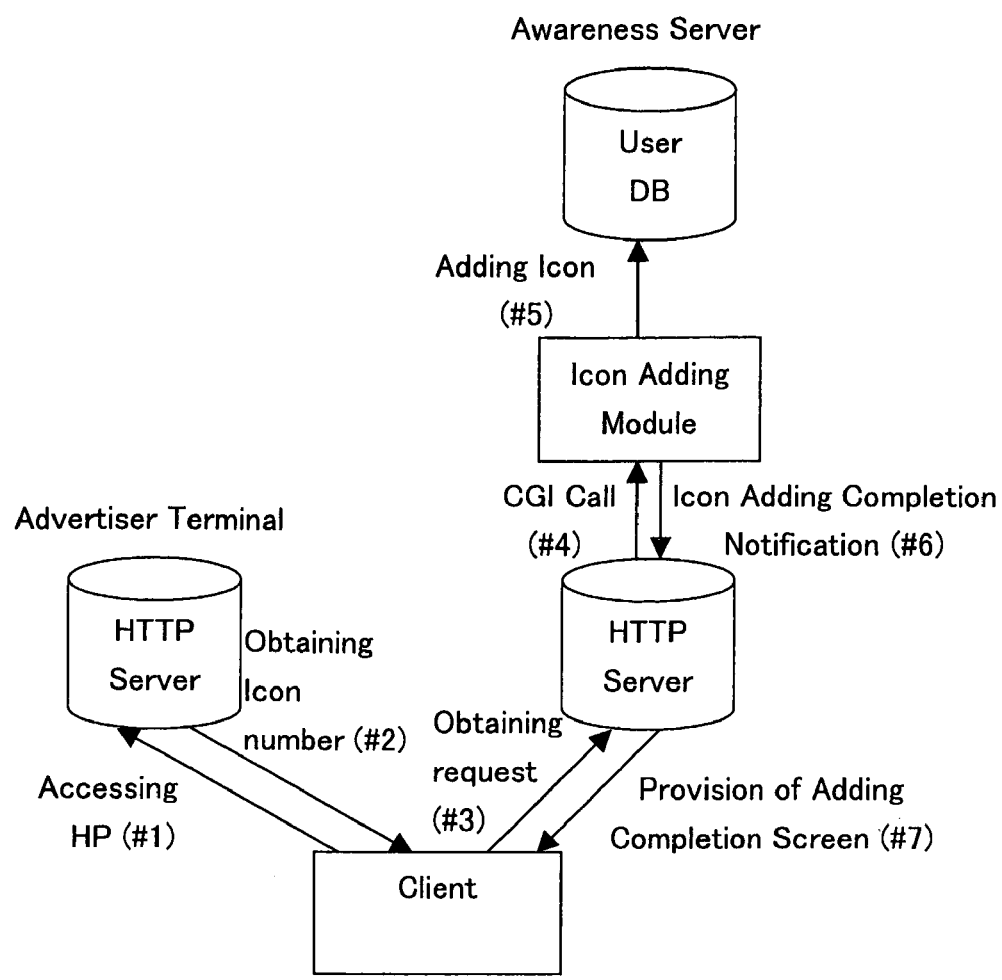
FIG. 7 is an explanatory diagram showing flow of icon obtaining process.

FIG. 7 is an explanatory diagram showing flow of icon obtaining process performed by the awareness server 1. The client 2 accesses the HcDonald's terminal 3 (#1) and obtains a homepage from the HTTP server 31. A button for setting HcDonald's icon for the client 2 is provided in the homepage. Link information is embedded in the button and when a user clicks the button, URL of the awareness server 1 and the icon number of HcDonald's are returned to the client 2 (#2).

The client 2 accesses the awareness server 1 according to the returned URL and passes user ID and the icon number of HcDonald's together with icon obtaining request to the HTTP server 11 (#3). The HTTP server 11 calls the icon adding module 18 (#4) and adds the HcDonald's icon to owned icons of the passed user ID with the module (#5). The icon adding module 18 returns icon adding completion notification to the HTTP server 11 (#6). In this manner, the HTTP server 11 provides adding completion screen for the client 2 and notifies the user that an advertisement icon was added (#7).

Figure 8A:
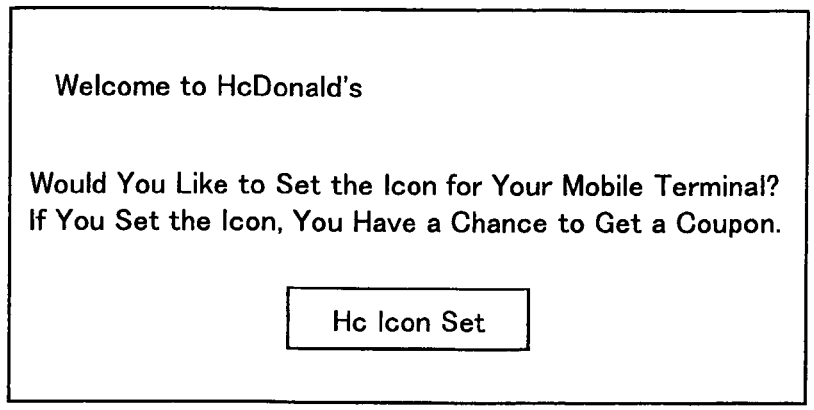
FIG. 8A is an example of a Web Page where an advertisement icon setting button is displayed.
Figure 8B:
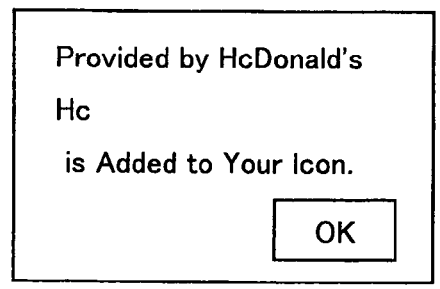
FIG. 8B is an example of a screen showing that an advertisement icon is added to an owned icon.

FIG. 8A shows an example of a HcDonald's homepage. In this homepage, a button for setting advertisement icons is provided. FIG. 8B is an example of a screen provided for the client 2 when the addition of an advertisement icon is completed.

(2) Advertisement Icon Copy Process

(2-1) Copy Process of Advertisement Icon Representing Buddy's Status

Figure 9:
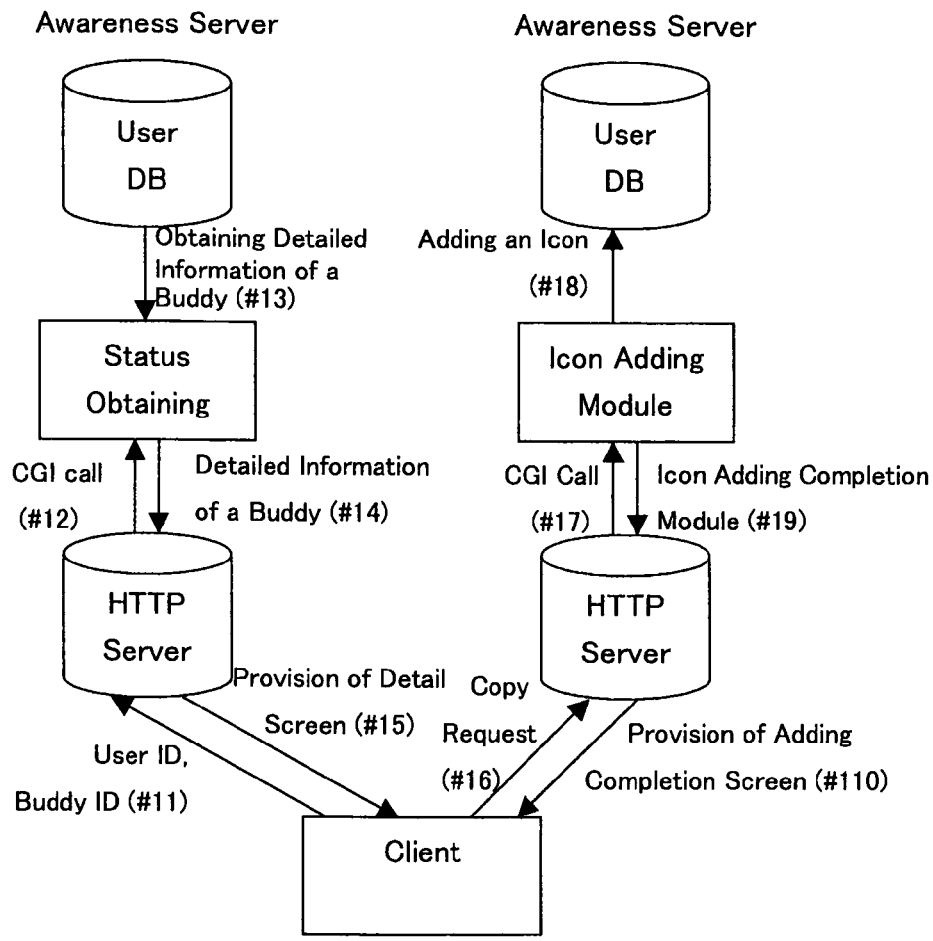
FIG. 9 is an explanatory diagram showing flow of icon copy process.

FIG. 9 is an explanatory diagram showing flow of an icon copy process performed by the awareness server 1. In this process, the awareness server 1 adds an advertisement icon represented as a buddy's status to a user owned icon.

The client 2 accesses the awareness server 1 and requests buddy's status (#11). User ID and buddy's ID are included in the request. The HTTP server 11 calls the status obtaining module 17 (#12) and obtains requested buddy's status from the user DB 12 (#13). The status obtaining module 17 provides obtained information for the client 2 via the HTTP server 11 (#14, #15).

Under the condition, for example, an advertisement icon of HcDonald's is displayed as buddy's status on the screen of the client 2. A button for requesting copies of advertisement icons is set in the screen provided for the client 2 (Refer to below-described FIG. 10.). When a user presses an icon copy button on the screen, the client 2 sends icon copy request to the awareness server (#16). This request includes user ID and icon number.

The HTTP server 11 calls icon adding module 18 (#17) and adds the HcDonald's icon to owned icons of the requester user (#18). The icon adding module 18 returns icon adding completion notification to the HTTP server 11 (#19). The HTTP server 11 provides adding completion screen for the client 2 (#110). With this screen, the user is notified that the HcDonald's icon is newly added as an owned icon.

Figures 10A, 10B:
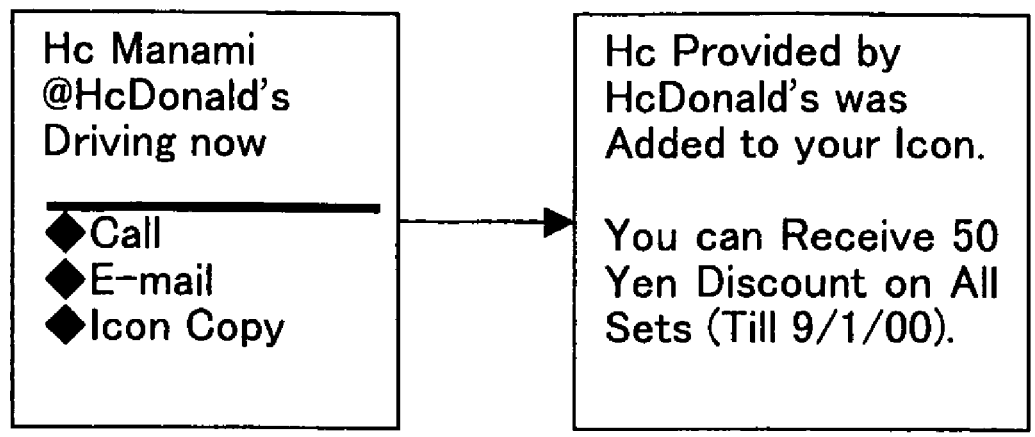
FIG. 10A is an example of a screen where icon copy is directed by designation of an advertisement icon.
FIG. 10B is an example of a screen showing that an advertisement icon is added to owned icon.

FIG. 10 is an example of a screen displayed in the client 2 during the above-mentioned process. FIG. 10A shows an example that the status of a user Manami registered in the buddy list is displayed with the HcDonald's icon. When the user selects "icon copy" in the screen, a screen shown in FIG. 10 B is displayed. This screen represents that the HcDonald's icon is added to owned icons of the user.

(2-2) Enrollment Process Concurrent with Copy

Figure 11:
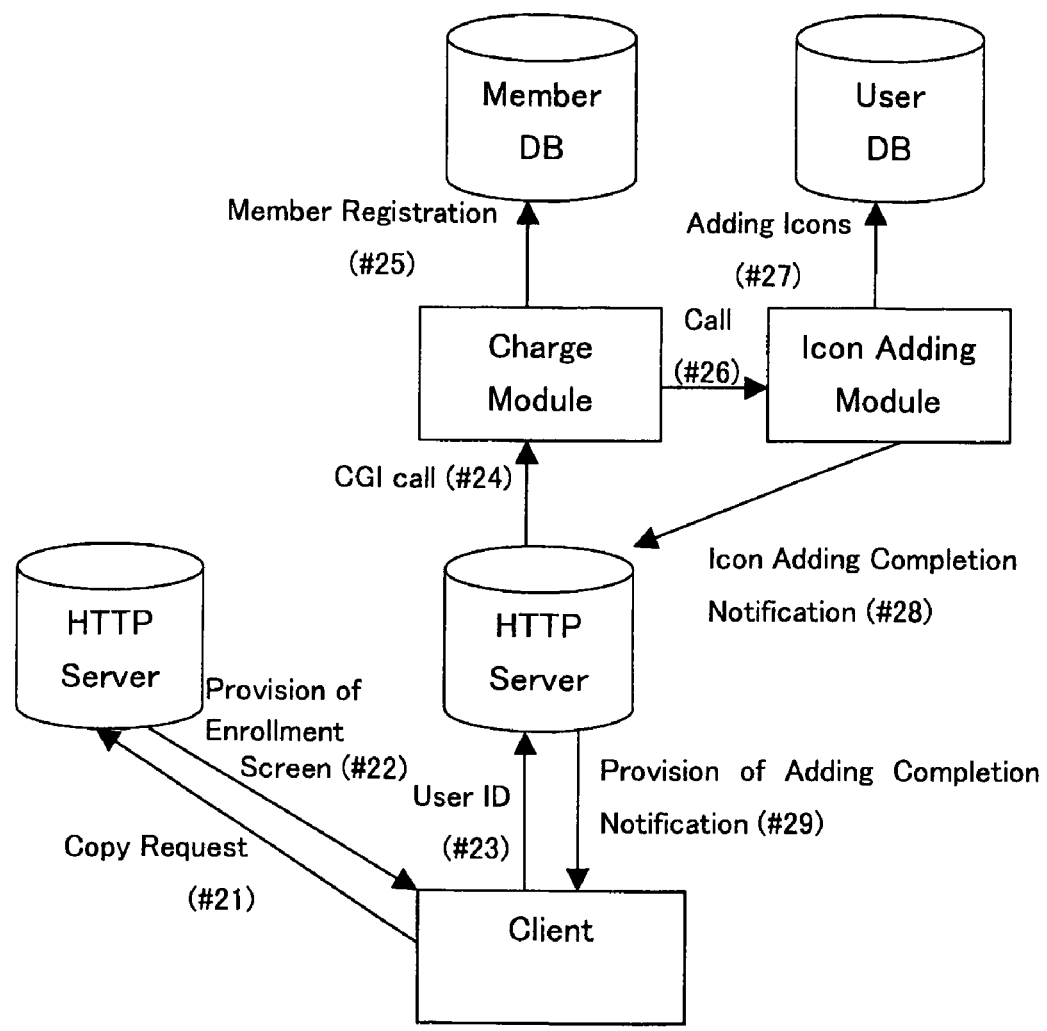
FIG. 11 is an explanatory diagram showing flow of enrollment process concurrent with icon copy.

FIG. 11 is an explanatory diagram showing flow of an enrollment process performed by the awareness server 1. In this process, the awareness server 1 copies the above-mentioned advertisement icon with charge.

Similarly as described above, the client 2 sends copy request to the awareness server 1 (#21). In response to the request, the awareness server 1 provides the client 2 with an enrollment screen that requests payment of charge (#22).

If a user selected enrollment, the client 2 notifies the awareness server 1 of user ID and intention of enrollment (#23). The awareness server 1 calls the charge module 19 (#24) and adds the user ID to the member DB 15 (#25). The charge module 19 also calls the icon adding module 18 and notifies it of the number of the advertisement icon requested to be copied (#26). The icon adding module 18 adds the notified icon number to owned icons of the user (#27), and returns icon adding completion notification to the HTTP server 11 (#28). The HTTP server 11 provides the client 2 with an adding completion screen of the advertisement icon (#29).

Figures 12A, 12B, 12C:
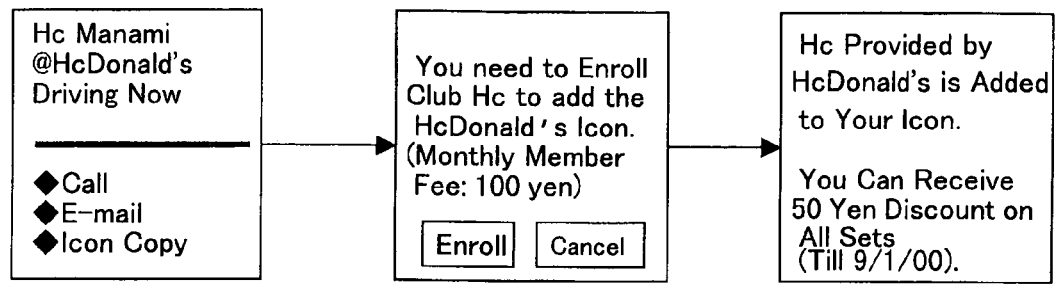
FIG. 12A is a display example of detailed display of buddy's status and icon copy button.
FIG. 12B is an example of enrollment screen confirming intention of enrollment.
FIG. 12C is a screen example showing that an advertisement icon is added to owned icon.

FIG. 12 is an example of a screen displayed by the client 2 during the above-mentioned process. FIG. 12A is an example of a buddy's status displayed with the HcDonald's advertisement icon. When a user selects "icon copy" in the screen, an enrollment screen shown in FIG. 12B is displayed. If the user select "enroll" in the screen, the user is notified of an icon adding completion screen in FIG. 12C.

(3) Coupon Providing Process by Icon Setting

Figure 13:
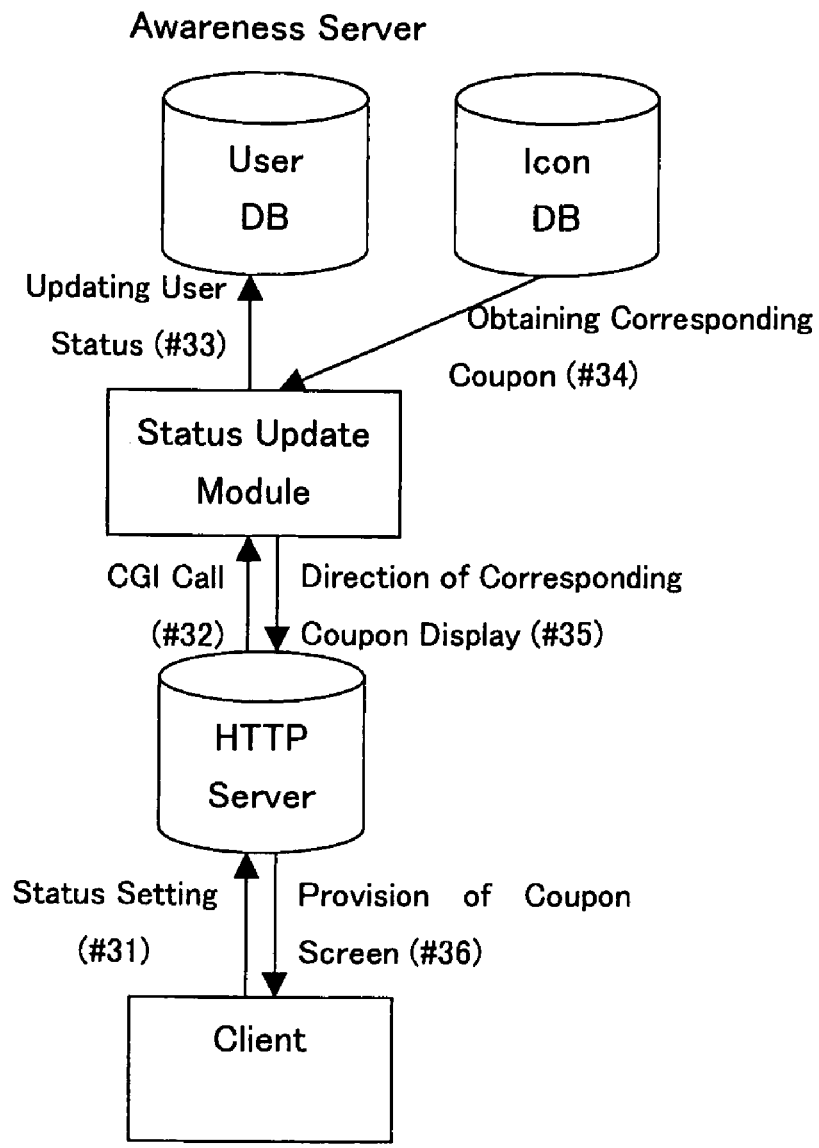
FIG. 13 is an explanatory diagram showing flow of coupon provision process based on icon setting.

FIG. 13 is a flow of process that a coupon of an advertiser is provided by setting an advertisement icon as a user status. In this process, privileges such as coupons are provided for users setting an advertisement icon as his status.

At first, a user sets the HcDonald's advertisement icon as his status (#31). The awareness server 1 calls the status update module 16 with the HTTP server 11 (#32) and sets an icon number for the user DB 12 as a new user status (#33). The status update module 16 obtains the URL of a coupon corresponding to the above-mentioned icon number from the icon DB 13 (#34). The status update module 16 obtains contents of the coupon by accessing the URL of the coupon (#35). Thereby, the awareness server 1 provides a coupon screen for the client 2 (#36).

Figures 14A, 14B, 14C:
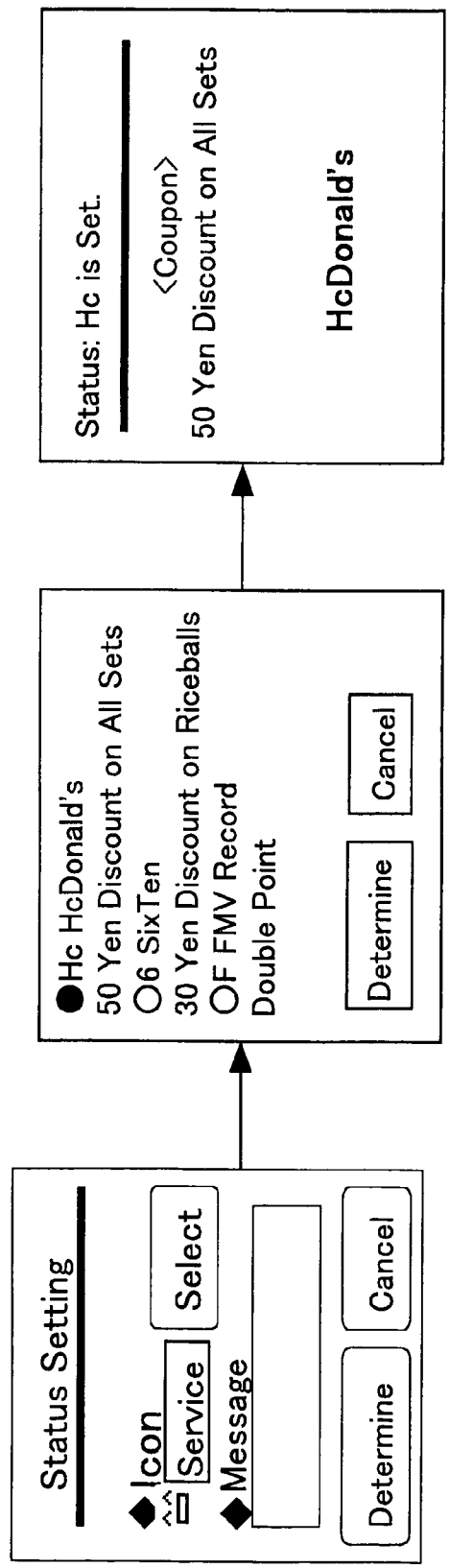
FIG. 14 is an example of coupon provision screen based on advertisement icon setting.

FIG. 14 is an example of screen displayed in the client 2 during the above-mentioned process. FIG. 14A is an example of a screen for users to set self status. When a user designates selection of an advertisement icon in this figure, a screen shown in FIG. 14B is displayed. On this screen, the user selects an advertisement icon to be set as a self status. The HcDonald's advertisement icon "Hc" is selected in this figure. Selecting a "decide" button now displays a screen shown in FIG. 14C. The user is notified that the advertisement icon is set as a self status of the user in this screen.

For example, when a user sets his self status to HcDonald's at the store and then a coupon is displayed, the user can enjoy privileges of the coupon by presenting the coupon to a clerk.

(4) Advertisement Icon Setting Process by use of a Coupon

(4-1) Advertisement Icon Setting Process by Display of a Coupon

FIG. 15 is a process displaying a button for setting an advertisement icon as a user status with a coupon on a homepage of an advertiser. By the process, input of user status setting along with coupon utilization is expected to be promoted.

It is conceivable that users normally display a coupon screen and try to enjoy privileges when they purchase items or purchases at the store. Therefore, first a user accesses a HcDonald's homepage (#41). A button for setting the HcDonald's icon together with various coupons provided by HcDonald's (refer to FIG. 16). In this button, a URL of the awareness server 1 and the icon number of HcDonald's are embedded as link information.

When the user presses an "icon setting button," a URL of the awareness server 1 and the HcDonald's icon number are returned to the client 2 from the HcDonald's HTTP server 31 (#42).

The client 2 that received the icon number accesses the awareness server 1 and passes user ID and the icon number with status setting request (#43). The HTTP server 11 of the awareness server 1 calls the status update module 16 (#44) and updates the user DB 12 (#45). Namely, a user status icon identified with the passed user ID is set to the passed icon number.

The status update module 16 returns status setting completion notification to the HTTP server 11 after the user DB 12 is updated (#46). With this, the HTTP server 11 provides setting completion screen for the client 2 (#47).

FIG. 16 is an example of a screen displayed in the client 2 in the above-mentioned process. FIG. 16A is an example of a screen where a coupon and "icon setting button" are displayed on the HcDonald's homepage. When the "icon setting button" is pressed on this Web Page, a screen shown in FIG. 16B is displayed. In this figure, it is displayed that the HcDonald's icon is set as a user status.

(4-2) Process Automatically Setting a User Status by Provision of a Coupon

FIG. 17 is an explanatory diagram of a process which automatically sets a user status by provision of a coupon. Users normally display a coupon screen and try to enjoy privileges of coupons when they purchase items or services at the store. Therefore, first the client 2 accesses the HcDonald s homepage as described above and requests a coupon screen (#51). The client 2 sends user ID to the advertiser terminal 3.

The HTTP server 31 of the advertiser terminal 3 calls the coupon issue module 32 (#52). The coupon issue module 32 stochastically determines whether or not a coupon is issued to the user and returns the result to the HTTP server 31 (#53). The HTTP server 31 provides a screen that notifies the user of the result for the user (#54).

At the same time the coupon issue module 32 notifies the awareness server 1 of user status (#55). This notification includes the user ID and HcDonald's icon number. This notification is performed whether a wining coupon or a blank coupon was drawn.

The awareness server 1 that received the notification calls the icon adding module 18 with the HTTP server 11 (#56) and sets the user status icon to the HcDonald's icon number (#57). Then the icon adding module 18 passes status setting completion notification to the HTTP server 11 (#58) and provides a setting screen for the client (#59).

Incidentally, the above-mentioned process can be applied in case that privileges such as coupons are always provided. Namely, the status of a user coupons are provided for can be set to an advertisement icon by the advertiser terminal 3. Privileges for users are not limited to coupons and may be a prize competition conducted based on lucky numbers written in sheets distributed at the shop, for example.

FIG. 18 is an example of a screen displayed in the client in the above-mentioned process. FIG. 18A is an example of a screen where a result of stochastically generated coupon is displayed. In the client 2, a result after a coupon provided on the homepage was drawn is displayed. Then setting of the status icon is notified on the client 2 as shown in the above-mentioned FIG. 16.

FIG. 18B is an example of a result display in case that a prize competition instead of a coupon is applied for. Users get application sheets at the shop, for example, and input numbers written in the sheets in the HcDonald's homepage. With this, the result of the prize competition such as wining or blank is displayed in the client. Then setting of the status icon is notified on the screen.

(5) Charge Process according to Icon Reference Count

FIG. 19 is an explanatory diagram of a process that the awareness server 1 charges to an advertiser according to icon reference count. In this process, the more advertisement icons are distributed to users i.e. the more advertisement icon reference count increases, the more the amount of charge to an advertiser goes up.

When the client 2 refers to the status of a buddy registered in a buddy list (#61, #62, #63) the status obtaining module 17 increments reference count of advertisement icons of the buddy that are referred to (#64).

The HTTP server 11 calls the charge module 19 at predetermined periods e.g. every one month (#65). The charge module 19 reads the reference count DB 14, determines how many times the advertiser's icons are referred to in this month for every advertises, and calculates charge amount according to reference count (#66). With this process, providers of the awareness server 1 can collect advertisement rates from advertisers.

(6) Incentive Process according to Icon Reference Count

FIG. 20 is an explanatory diagram of a process that provides incentive for users according to reference count of icons. In this process, the more advertisements are distributed to users i.e. the more status of a user is referred to by other users, privileges such as the more discount tickets and coupons are provided for advertisers and users.

When the client 2 refers to status of a buddy registered in a buddy list (#91, #92, #93), the status obtaining module 17 increments reference count of advertisement icons of the buddy that are referred to (#94).

The advertiser terminal 3 accesses the HTTP server 11 at predetermined period e.g. every one month (#95), reads the reference count DB 14 with the charge module 19 (#96, #97), and obtains the reference count of their own company of the month (#98). Then the incentive module 33 determines incentive for each user according to reference count.

Furthermore, when a buddy copies an advertisement icon representing user status, incrementing copy count of the user's advertisement icon enables incentive to be given to users according to copy count as well as reference count of icon.

With this process, users obtain from advertisers consideration of advertising advertiser's icons in place of advertisers.

Second Embodiment

[A] Configuration

FIG. 21 is a configuration diagram of an awareness system according to a second embodiment of the present invention. In this system, outlet terminal 5 in addition to the configuration of the above-mentioned first embodiment of the present invention is added. Purchase module 21 and non-contact IC card 22 are provided for the client 2. Account settlement module 51 and card reader 52 are provided for the outlet terminal 5.

[B] Process Flow (1) FIG. 22 is an explanatory diagram showing flow of a process performed by the client 2 and the outlet terminal 5 in this embodiment of the present invention. In this awareness system, the following process is performed in addition to the process as described in the first embodiment of the present invention. In the following process, status icons are set when a user purchases items or services in HcDonald's.

To simplify the description, a case of purchase with a credit card is exemplified. When a user purchases items, etc., the purchase module 21 is activated and account settlement information stored in the client 2 is sent to the outlet terminal 5 from the client 2 (#71, #72). Herein settlement information are number of a credit card, card type, good thru, etc.

Non-contact IC cards and non-contact IC card reader 52 are used for sending between the client 2 and the outlet terminal 5. Account settlement information of users is passed to the account settlement module 51 of the outlet terminal, predetermined account settlement process is performed, and then account settlement completion notification is sent to the client 2 (#73, #74, #75). The notification includes numbers of advertisement icons stored in the outlet terminal 5.

When the client 2 receives the account settlement completion notification, the client 2 sends icon number and user ID to the awareness server 1. The awareness server 1 that received the information sets the icon number for a status icon as described in above-mentioned FIG. 15 and provides setting completion screen for the client 2.

(2) In the above-mentioned process, status setting is performed on the client 2. However, status setting may be performed on the outlet terminal 5. In this case, user ID is passed to the outlet terminal along with account settlement information. The account settlement information module 51 sends account settlement completion notification and then sends user ID and the number of advertisement icon to the awareness server 1 to request status setting.

(3) The above-mentioned process can be applied in the case of virtual outlets which do not have physical existence such as shopping sites on a network. In this case, inputting account settlement information in predetermined form on an Web Page and sending it to a shopping site allow account settlement information to be sent and received between the client 2 and outlet terminal 5. Then the client 2 or outlet terminal 5 requests status setting to the awareness server 1.

Third Embodiment

[A] Configuration

FIG. 23 is an overall configuration diagram of an awareness system according to a third embodiment of the present invention. The system according to the embodiment is configured by adding the outlet terminal 5 and customer DB 6 to the above-mentioned first embodiment. The outlet terminal 5 has discount module 51 and card reader 52. The customer DB 6 stores the number of point cards issued by advertiser HcDonald's, user ID of a point card owner, and a point of the user.

[B] Process Flow

FIG. 24 is a flow of a process in which status icons are set by using HcDonald's point cards without using a mobile terminal. This system performs the following process in addition to the process as described in the above-mentioned first embodiment.

First a user presents a point card to clerks, etc. at purchase. The card is read by the card reader 53 of the outlet terminal 5 and a card number stored in the card is sent to the discount module 51 (#81). The discount module 51 reads from the customer DB 6 a user ID corresponding to the card number and the point of the user (#82) and performs prescribed discount process. Furthermore, the discount module 51 sends setting request of status icon to the awareness server 1 (#83). The request includes icon number and user ID. Then the icon number is set for the status icon similarly as described above.

Fourth Embodiment

FIG. 25 is a configuration diagram of an awareness system according to a fourth embodiment of the present invention. The system according to this embodiment has another service provider terminal 3 instead of the advertiser terminal 7 in the first embodiment of the present invention. Herein another service provider terminal 7 (hereinafter referred to as service terminal 7) is a server providing game applications on a network, for example. HTTP server 71 having an interface function between the awareness server 1 and client 2 and sending module 72 are provided for the terminal 7.

The awareness system having this configuration performs the following process in addition to the process described in the first embodiment of the present invention. For example, assume that the service terminal 7 provides a game application group enabling battles on a network. The service terminal 7 stores numbers of advertisement icons representing own companies.

Assume that the client 2 accesses the service terminal 7 and selects any of the application. In this case, the service terminal 7 sends to the awareness server an advertisement icon number of own company, IDs of an accessing user, and selected application name. The awareness server 1 updates the status icon of the user according to the information and distributes it to another user as user status. At this moment, if the application name is distributed, buddies are notified what kind of game the user plays.

Figure 26:
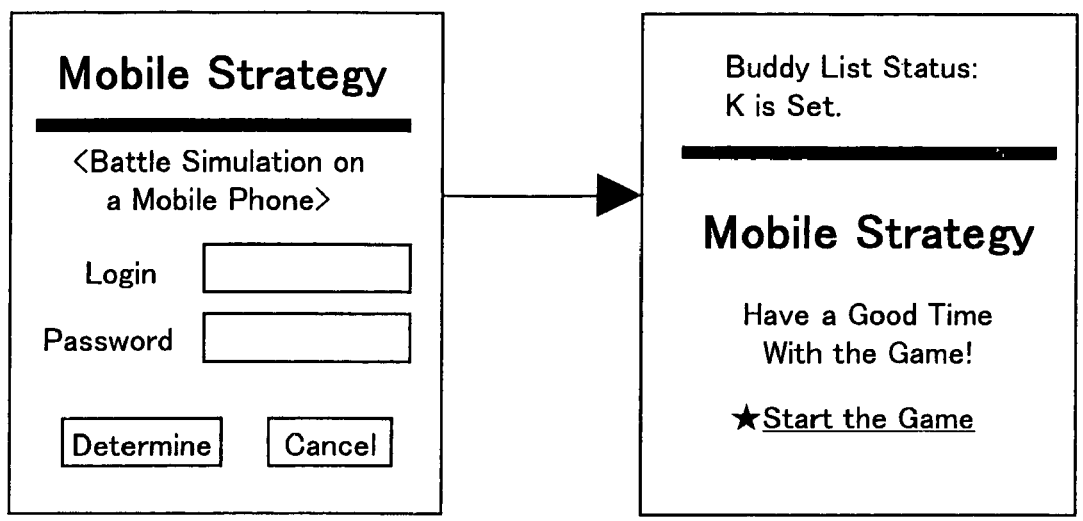

FIG. 26 is an example of a screen displayed in the client 2 in the system according to the embodiment. FIG. 26 A is an application selection screen displayed in the client 2 accessing the service terminal 7. Pressing "determine" button on this screen enables an application to be selected. FIG. 26 B is an example of a screen displayed in the client 2 by the awareness server 1. In this screen, that self status of the user is set to an icon representing an application provider is notified of.

Incidentally, the service terminal 7 can provide another application, voice data, video data, various files, etc as well as game applications.

Fifth Embodiment

FIG. 27 is an overall configuration diagram of an awareness system according to the fifth embodiment of the present invention. The awareness system according to this embodiment is configured by providing contents DB 21 and using module 22 for the client 2 in the awareness system according to the first embodiment of the present invention. Advertisement icons are created to represent predetermined units such as contents or contents producers, not companies.

The contents DB 21 stores various information such as music, movies, text files, applications, etc. The using module 22 detects that any of the contents is used and notifies the awareness server 1 of user ID and an icon number representing contents used. With this, for example, when a user listens to music, self status is automatically set to a status icon that represents the music being listened to.

Figure 28:
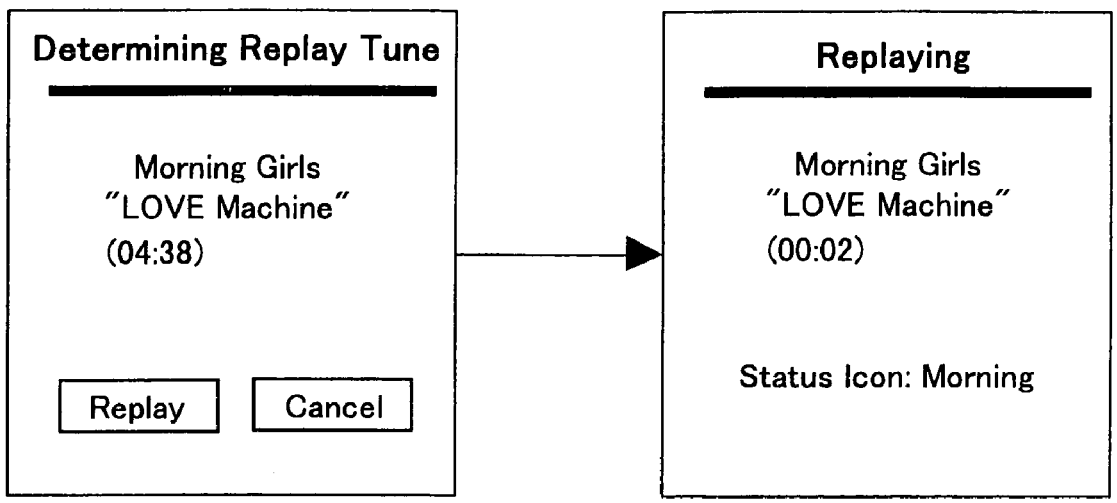

FIG. 28 is an example of a screen displayed on the client in this system. FIG. 28A is a contents selection screen displayed on the client. FIG. 28B is an example of a screen where the status of the client is displayed with an advertisement icon representing a group singing the song by reproducing the music the client selected.

Sixth Embodiment

[A] Configuration

FIG. 29 is a configuration diagram of an awareness system according to a sixth embodiment of the present invention. In this system of this embodiment, an outlet terminal 5 is added thereto in addition to the configuration of the above-mentioned first embodiment of the present invention. Wireless units 25 and 53 are provided for the client 2 and the outlet terminal 5. The client 2 and outlet terminal 5 can communicate each other with the wireless units 25 and 53 such as Bluetooth.

[B] Process Flow (1) FIG. 30 is an explanatory diagram showing flow of a process performed by the client 2 and outlet terminal 5 in this embodiment. In this awareness system, the following process is performed in addition to the process described in the first embodiment. In the following process, when a user comes to an outlet of an advertiser, user status is automatically set to status icon.

To simplify the explanation, the case that user status is set by an outlet terminal is exemplified. When a user comes to an outlet, the wireless unit 25 sends user ID stored in the client 2 to the outlet terminal 5 (#101).

User ID is passed to the wireless unit 53 of the outlet terminal 5. Then the outlet terminal 5 sends advertisement icon and user ID that are previously stored to the awareness server 1 (#102). The awareness server 1 that received the information sets the icon number to the status icon in a similar way described in above-mentioned FIG. 15 and provides setting completion screen to the client 2.

(2) In the above-mentioned process, status setting is performed on the outlet terminal 5. However, it may be set on the client 2. FIG. 31 shows flow of a process in case that status setting is performed on the client 2. In this case, an advertisement icon number is sent to the client 2 from the outlet terminal 5 with the wireless unit 53. The client 2 receives advertisement icon number and then sends user ID and advertisement icon number to the awareness server 1 to request the status setting.

Other Embodiments (A) The above-mentioned embodiments can be appropriately combined and used if necessary.

(B) In the above-mentioned embodiments, advertisement icons are not limited to icons representing companies. Advertisement icons representing predetermined units and objects can be set according to needs. For example, icons representing item name, item series, musician group, producer etc. are conceivable. Advertising companies can create icons representing object they want to advertise according to needs and use them as advertisement icons.

(C) A recording medium that records a program for executing the above-described methods of the present invention is included in the present invention. Herein a computer-readable medium can be a floppy disk, hard disk, semiconductor memory, CD-ROM, DVD, MO, etc.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments set forth in the present invention is provided for illustration only, and not for the purpose of limiting the invention as defined by the appended claims and their equivalents.

What is claimed is:

1. An advertising method for distributing advertisements to user terminals on a network from an awareness device for managing user status, the advertising method comprising:
   storing as a status-setting alternative for a primary user a symbol representing an advertiser, the symbol being obtained by a user terminal of the primary user from a system of the advertiser;
   accepting a request to set the symbol obtained by the user terminal of the primary user as a status of the primary user, said request being sent from the system of the advertiser when the system of the advertiser offers a coupon to the primary user; and
   distributing to a user terminal used by a secondary user the symbol obtained by the user terminal of the primary user as the status of the primary user via the network.

2. A computer-readable recording medium on which is recorded a program for an advertising method for distributing advertisements to user terminals on a network, the program being employed by an awareness device for managing user status, the program causing a computer to perform at least:
   storing as a status-setting alternative for a primary user a symbol representing an advertiser, the symbol being obtained by a user terminal of the primary user from a system of the advertiser;
   accepting a request to set the symbol obtained by the user terminal of the primary user as a status of the primary user, said request being sent from the system of the advertiser when the system of the advertiser offers a coupon to the primary user; and
   distributing to a user terminal used by a secondary user the symbol obtained by the user terminal of the primary user as the status of the primary user via the network.

3. An awareness server for managing user status, the awareness server communicatively connected terminals via a network and comprising:
   storing means storing as a status-setting alternative for a primary user a symbol representing an advertiser, the symbol being obtained by a user terminal of the primary user from a system of the advertiser;
   accepting means accepting a request to set the symbol obtained by the user terminal of the primary user as a status of the primary user, said request being sent from the system of the advertiser when the system of the advertiser offers a coupon to the primary user; and
   distributing means distributing to a user terminal used by a secondary user the symbol obtained by the user terminal of the primary user as the status of the primary user via the network.

* * * * *

UNITED STATES PATENT AND TRADEMARK OFFICE
CERTIFICATE OF CORRECTION

| | |
|---|---|
| PATENT NO. | : 7,099,831 B2 |
| APPLICATION NO. | : 09/771692 |
| DATED | : August 29, 2006 |
| INVENTOR(S) | : Madoka Mitsuoka et al. |

It is certified that error appears in the above-identified patent and that said Letters Patent is hereby corrected as shown below:

On the Title page:

Item (56) References Cited, U.S. Patent Documents, Col. 2, line 6, change "Mitsoka et al." to --Mitsuoka et al.--

In the claims:

Claim 3, Col. 18, line 36, after "connected" insert --user--

Signed and Sealed this

First Day of May, 2007

JON W. DUDAS
*Director of the United States Patent and Trademark Office*